US007241219B2

(12) United States Patent
Walker et al.

(10) Patent No.: US 7,241,219 B2
(45) **Date of Patent: *Jul. 10, 2007**

(54) METHODS AND APPARATUS FOR PROVIDING ENTERTAINMENT CONTENT AT A GAMING DEVICE

(75) Inventors: Jay S. Walker, Ridgefield, CT (US); James A. Jorasch, Stamford, CT (US); Thomas M. Sparico, New York, NY (US); Magdalena M. Fincham, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 634 days.

This patent is subject to a terminal disclaimer.

(21) Appl. No.: 10/395,529

(22) Filed: Mar. 21, 2003
(Under 37 CFR 1.47)

(65) Prior Publication Data

US 2003/0211889 A1 Nov. 13, 2003

Related U.S. Application Data

(63) Continuation-in-part of application No. 09/466,720, filed on Dec. 17, 1999, now Pat. No. 6,582,310, which is a continuation of application No. 08/814,889, filed on Mar. 12, 1997, now Pat. No. 6,113,495.

(60) Provisional application No. 60/374,369, filed on Apr. 19, 2002.

(51) Int. Cl.
*A63F 9/24* (2006.01)
*A63F 13/00* (2006.01)

(52) U.S. Cl. ............................ 463/20; 463/16; 463/25

(58) Field of Classification Search .................. 463/18, 463/19, 20

See application file for complete search history.

(56) References Cited

U.S. PATENT DOCUMENTS 4,926,327 A 5/1990 Sidley ........................ 364/412
5,237,157 A 8/1993 Kaplan ........................ 235/375
5,259,613 A 11/1993 Marnell, II ............. 273/138 A (Continued)

FOREIGN PATENT DOCUMENTS

WO WO 95/30944 11/1995

OTHER PUBLICATIONS

Shah, Rawn, "Suggestions for Information Kiosk Systems using the World Wide Web", The World Wide Web Information Kiosks Special Interest Group, Apr. 30, 1994.

(Continued)

*Primary Examiner*—John M. Hotaling, II
*Assistant Examiner*—Sunit Pandya
(74) *Attorney, Agent, or Firm*—Taylor M. Davenport

(57) ABSTRACT

Gaming systems and methods of operation thereof are disclosed. Such gaming systems and methods allow a player of a gaming device, such as a slot machine or an arcade video game, to access entertainment services, such as broadcast television programming, web sites, pay-per-view services and shared-revenue telephone services, such as 900 or 976 services, for enhanced player retention. In accordance with one or more embodiments, when play is initiated, a predefined establishment-specific criteria is evaluated to determine whether the player should be provided with access to entertainment services. A player entitled to access such services may be presented with a list of available entertainment services. Upon receipt of the player's selection, in accordance with one or more embodiments, a connection may be established between the gaming device and the provider of the selected entertainment service. In accordance with one embodiment, the content that is the entertainment service is store in the memory of the gaming device or a peripheral device and output to the player. The player's level of play may be monitored to ensure that the establishment-specific criteria for maintaining access to such entertainment services is being met.

61 Claims, 12 Drawing Sheets

U.S. PATENT DOCUMENTS

| | | | | |
|---|---|---|---|---|
| 5,429,361 | A | 7/1995 | Raven et al. | 273/138 A |
| 5,488,411 | A | 1/1996 | Lewis | 348/8 |
| 5,530,852 | A | 6/1996 | Meske, Jr. et al. | 395/600 |
| 5,550,561 | A | 8/1996 | Ziarno | 345/163 |
| 5,590,197 | A | 12/1996 | Chen et al. | 380/24 |
| 5,592,212 | A | 1/1997 | Handelman | 348/12 |
| 5,592,375 | A | 1/1997 | Salmon et al. | 395/207 |
| 5,594,661 | A | 1/1997 | Bruner et al. | 364/514 R |
| 5,638,426 | A | 6/1997 | Lewis | 379/90 |
| 5,646,988 | A | 7/1997 | Hikawa | 379/266 |
| 5,675,828 | A | 10/1997 | Stoel et al. | 395/825 |
| 5,752,882 | A | 5/1998 | Acres et al. | 463/42 |
| 5,761,647 | A | 6/1998 | Boushy | 705/10 |
| 5,781,734 | A * | 7/1998 | Ohno et al. | 725/115 |
| 5,839,960 | A | 11/1998 | Parra et al. | 463/41 |
| 5,851,149 | A * | 12/1998 | Xidos et al. | 463/42 |
| 5,935,002 | A | 8/1999 | Falciglia | 463/19 |
| 5,971,271 | A * | 10/1999 | Wynn et al. | 235/380 |
| 6,113,495 | A * | 9/2000 | Walker et al. | 463/42 |
| 6,139,431 | A * | 10/2000 | Walker et al. | 463/20 |
| 6,302,790 | B1 * | 10/2001 | Brossard | 463/20 |
| 6,533,658 | B1 * | 3/2003 | Walker et al. | 463/13 |
| 6,582,310 | B1 * | 6/2003 | Walker et al. | 463/42 |
| 6,712,698 | B2 * | 3/2004 | Paulsen et al. | 463/30 |
| 6,942,574 | B1 * | 9/2005 | LeMay et al. | 463/41 |
| 6,945,870 | B2 * | 9/2005 | Gatto et al. | 463/29 |
| 2005/0096125 | A1 * | 5/2005 | LeMay et al. | 463/25 |

OTHER PUBLICATIONS

Christiansen, Eugene Martin, "Gaming and entertainment—an imperfect union?", Cornell Hotel & Restaurant Administration Quarterly, Apr. 1995, Section: vol. 36, No. 2, p. 79, ISSN: 0010-8804.

"Takasago Denki to offer Video-On-Demand Game Machines", COMLINE Daily News Computers, Apr. 4, 1995.

Schafer, Sarah, "Street Cruising", Technology Inc., 1996, No. 2, p. 19, Ref. No. 16960191.

Roger, Dennis, "tpNet ready to help in the hunt for NZ products", The Press, Jul. 23, 1996, Section: Features, Computers, p. 24, Computers & Business Technology.

Evenson, Laura, "Back in the Game Nolan Bushnell, creator of Atari and 'Pong' has come up with TeamNet and TouchN", The San Francisco Chronicle, Aug. 23, 1996, Section: Daily Datebook, p. D1.

Miller, Donald, "Terminal is set up for public use", Santa Cruz Sentinel, Sep. 29, 1996, Section: p. D1.

Denton, Nicholas, "British Telcom launches public online booths", The Financial Post, Oct. 29, 1996, Section: Section 1, News, p. 10.

"Internet pub scorns the café 'anoraks'", The Herald, Dec. 2, 1996, Section: p. 4.

Bueschel, Richard, "The Encyclopedia of Pinball vol. 1", Jan. 1997.

Price, Stuart, "Connected: Kiosks get off to a slow start Technology BT's touch-screen information points have to clear a cultural hurdle", The Daily Telegraph, Feb. 4, 1997, Section p. 06.

Website: "Net Access Inc. Home Page", (http www.netaccessinc com/index html), download date: Feb. 27, 1997.

Website: "The Public Access Coin Operated Internet Browser", (http//embed com 80/coinet htm), download date: Feb. 27, 1997.

"The Internet Goes Mainstream", RePlay Magazine, Mar. 1997, pp. 179-183.

* cited by examiner

400

| | PLAYER TRACKING NUMBER 420 | CASINO RATING 425 | THEORETICAL WIN 430 | CURRENT BALANCE OF REWARD POINTS 435 | CONTENT PREFERENCE 440 |
|---|---|---|---|---|---|
| 410 | PT 568241 | HIGH ROLLER | $8,962 | 5,941 | MAJOR LEAGUE BASEBALL |
| 411 | PT 973804 | MEDIUM VALUE | $476 | 371 | COMEDY MOVIES |
| 412 | PT 773607 | MEDIUM VALUE | $398 | 265 | REALTIME STOCK QUOTES |

FIG. 4

500

| | PREMIUM ENTERTAINMENT SERVICE 520 | CONTENT PROVIDER 525 | ACCESS INFORMATION 530 | ACCOUNT NUMBER 535 | PASSWORD 540 | COST 545 |
|---|---|---|---|---|---|---|
| 510 | WORLD SERIES BASEBALL | XYZ SPORTS SERVICE | CABLE TV CHANNEL 10 | 893E | FRANKLIN | $2 PER GAME PER PLAYER |
| 511 | STOCK TIPS | ABC FINANCIAL | WWW. ABCFINANCE.COM | A5790432 | LINCOLN | $5 PER REPORT |
| 512 | HOROSCOPE READINGS | HOROSCOPE HOTLINE | 1-900-555-1212 | 230517 | CHAT | $1.50 PER MINUTE |

FIG. 5

600

| | CONNECTION ID NUMBER 620 | PLAYER TRACKING NUMBER 625 | DATE 630 | TIME 635 | CONNECTION DURATION 640 | CONTENT PROVIDER 645 | COST 650 |
|---|---|---|---|---|---|---|---|
| 610 | C 573024 | PT 773607 | 3/18/03 | 5:36 PM | 35 MINUTES | XYZ SPORTS SERVICE | $2.00 |
| 611 | C 588913 | PT 950002 | 3/19/03 | 2:45 PM | 12 MINUTES | HOROSCOPE HOTLINE | $18.00 |
| 612 | C 590522 | PT 476650 | 3/19/03 | 2:05 PM | ONE REPORT | ABC FINANCIAL | $5.00 |

FIG. 6

METHODS AND APPARATUS FOR PROVIDING ENTERTAINMENT CONTENT AT A GAMING DEVICE

The present Application claims the benefit of U.S. Provisional Application Ser. No. 60/374,369, filed Apr. 19, 2002 in the name of Walker et al. The entirety of this Provisional Application is incorporated by reference herein for all purposes.

The present Application is a Continuation-In-Part of commonly-owned U.S. application Ser. No. 09/466,720, filed Dec. 17, 1999 and issued Jun. 24, 2003 as U.S. Pat. No. 6,582,310 in the name of Walker et al. and entitled AN ELECTRONIC GAMING SYSTEM OFFERING PREMIUM ENTERTAINMENT SERVICES FOR ENHANCED PLAYER RETENTION; which is a Continuation of U.S. application Ser. No. 08/814,889, filed Mar. 12, 1997 and issued Sep. 05, 2000 as U.S. Pat. No. 6,113,495. The entirety of each of these Applications is incorporated by reference herein for all purposes.

BACKGROUND OF THE INVENTION

Gaming devices, such as slot machines, video poker, video keno or video blackjack devices or other electronic gaming devices, such as arcade video games, are an important source of income for the gaming industry and arcades. Accordingly, many casinos and arcades constantly search for marketing strategies and programs to appeal to players and to distinguish their electronic gaming devices from competitors in the industry. For example, as an added incentive to play the slot machines, many casinos offer “slot club” programs to reward slot machine players. Each player in a slot club is generally issued a player tracking card encoded with his identification number. The casino awards “player reward points” for the player as he plays slot machines in that casino. The “player reward points” can generally be redeemed, for merchandise or services at the casino hotel. In many cases, however, these incentives may not be sufficient to attract new players or to retain existing casino players at slot machines.

Thus, a number of programs have been implemented or suggested in an attempt to retain players at slot machines and other electronic gaming devices. For example, many casinos provide players with various forms of entertainment and services directly at the slot machine. U.S. Pat. No. 5,259,613, entitled “Casino Entertainment System”, discloses an entertainment system for slot players in a casino which includes audio/video equipment at each slot machine for communicating with a central control station. The operator at the central station selects audio/video programming from a menu of available selections, for presentation at one or more of the slot machines in the casino. The available audio/video programming is obtained from a number of conventional sources, including a VCR, an audio tape deck, a live camera or microphone and commercial television broadcasting sources, including cable television programming. Unfortunately, such conventional casino and arcade entertainment systems have experienced only marginal success in retaining players at slot machines and other electronic gaming devices.

In addition to benefiting from retaining players at gaming devices, establishments in which the gaming devices are located also benefit from certain activities engaged in by players while the players are playing the gaming devices. For example, gaming devices that experience a high rate of play and/or large wager amounts per play are more profitable. In another example, a gaming establishment in which a gaming device is located benefits if a player inputs into a gaming device an amount of money sufficient to pay for a plurality of game plays, rather than inputting an amount of money sufficient to pay for only a single game play, since the former player is more likely to play the gaming device for a longer period of time. However, conventional gaming devices and gaming systems do not sufficiently motivate players to engage in behaviors that are beneficial to the casino.

As apparent from the above-described deficiencies with conventional systems, a need exists for a gaming system that more effectively retains players at gaming devices and more effectively motivates players of gaming devices to engage in behaviors beneficial to the establishments in which the gaming devices are located

BRIEF DESCRIPTION OF DRAWINGS

FIG. 4 illustrates a sample table from the player tracking database of FIG. 2;

FIG. 5 illustrates a sample table from the content database of FIG. 2;

FIG. 6 illustrates a sample table from the connection record database of FIG. 2;

DETAILED DESCRIPTION

Figure 1A:
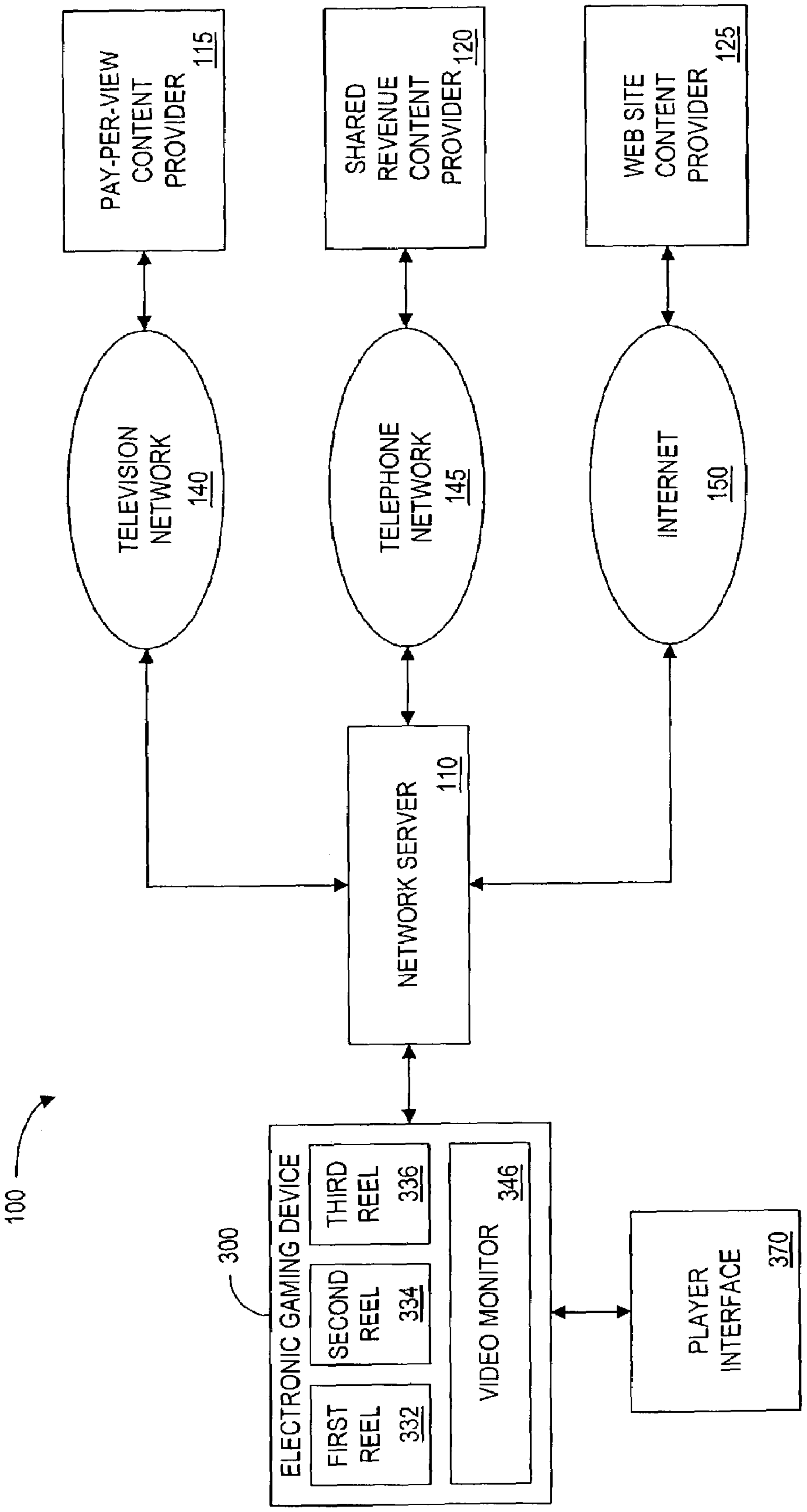
FIG. 1A is a schematic block diagram illustrating a suitable system for establishing communication between a gaming device, such as a slot machine, and one or more entertainment service providers.

The present invention relates generally to methods and systems for increasing the utilization of a gaming device, such as a slot machine or arcade video game, and for rewarding a player playing such a gaming device for engaging in behavior that is deemed to be beneficial to the establishment in which the gaming device is located. The methods and apparatus of the present invention provide players of gaming devices with an incentive for continued play. In one or more embodiments, the incentive comprises access to one or more entertainment services. Such entertainment services may comprise, for example, broadcast television content, Web sites, pay-per-view services and shared-revenue telephone services. The access may be provided, for example, via (i) a network server in communication with a gaming device, (ii) communication between the gaming device and a provider of an entertainment service (e.g., television broadcaster); (iii) a peripheral device associated with the gaming device; and/or (iv) the gaming device alone (e.g., in an embodiment where content comprising the entertainment service is stored at the gaming device).

Generally, according to one or more embodiments, a player will be permitted to access entertainment services, such as premium web sites, pay-per-view services and shared-revenue services (e.g., such as 900 or 976 services), directly from the gaming device for as long as the player meets the entitlement requirements established by, for example, the establishment in which the gaming device is located (e.g., the casino or arcade). Such requirements for accessing entertainment services are refeffed to herein as the "establishment-specific criteria". Alternately, an entity besides or in addition to the establishment where the gaming device is located may specify one or more criteria that must be satisfied in order for a player to obtain access to entertainment services in accordance with the present invention. For example, in one embodiment, a provider of the content that is the entertainment service (e.g., a television broadcaster) may establish one or more criteria that must be satisfied in order for a player to gain access to entertainment services. In another embodiment, a manufacturer or designer of the gaming device may specify one or more criteria that must be satisfied in order for a player to gain access to one or more entertainment services.

In one or more embodiments, a gaming device may access the entertainment services via a network server. In an alternate embodiment, entertainment content may be stored at a gaming device in addition to or in lieu of being stored at a network server. In yet another alternate embodiment, a gaming device may be operative to access one or more entertainment services without aid of the network server and without storing the content comprising the entertainment service. For example, the gaming device may be operative to access the telephone network directly to provide the player with access to the telephone-based entertainment service. In yet another embodiment, a gaming device may be associated with a peripheral device that is operable to communicate with a provider of an entertainment service or that stores content comprising the entertainment service.

In an embodiment where access to the entertainment service is gained via the network server, the network server may be notified when a player commences play at a particular gaming device. The network server may evaluate establishment-specific criteria to determine whether the player should be offered access to entertainment services while playing. In an alternate embodiment, a gaming device may be programmed to evaluate such criteria to determine whether a player has qualified for access to entertainment services and to enable access to the player for such services. In one illustrative embodiment, the establishment-specific criteria can offer access to the content entertainment services on the following basis: (i) unlimited complimentary usage to all players whose prior playing history meets predefined criteria, (ii) unlimited complimentary usage to all players on certain classes or types of electronic gaming devices, (iii) limited complimentary access to those players whose current level of play meets or exceeds a predefined threshold, or (iv) access in exchange for a cash payment or player reward points awarded as part of a slot club or an arcade incentive program, regardless of any current level of play.

In one or more embodiments, if the establishment-specific criteria for providing or offering the player the entertainment services is met, a menu of the available entertainment services may be transmitted to the gaming device for display to the player. Alternately, a menu of available entertainment services may be stored locally at the gaming device. In such an embodiment, the gaming device may be directed to display the menu (e.g., by the server) or may be programmed to display the menu when it is determined (e.g., by the gaming device and/or by the server) that the player has qualified for access to the entertainment services. The player thereafter enters his selection of a desired premium entertainment service, which selection is transmitted to the network server. Alternately, in an embodiment where access to the entertainment service is direct from the gaming device, or in an embodiment where the content comprising the entertainment service is stored at the gaming device, the player may be provided with his selected entertainment service by the gaming device upon making a selection. Upon receipt of the player's selection, a content database may be accessed to retrieve information required to access the selected content provider (in embodiments where the content is not stored at the gaming device or a peripheral device associated with the gaming device), such as the appropriate external network and network address to be utilized, as well as any required account number and/or password. A connection may thereafter be established (e.g., by the network server, by the gaming device, or by a peripheral device associated with the gaming device) between the gaming device and the selected content provider.

In one or more embodiments, once the connection to the selected entertainment service is established, the level of play of the player may be monitored to determine if the establishment-specific criteria for maintaining access to the selected premium entertainment service is being met. Criteria for maintaining access to the selected entertainment service may be the same as criteria for first gaining access to the entertainment service. For example, if a predetermined rate of play (e.g., predetermined number of game plays initiated per unit of time) must be achieved by a player in order to gain access to an entertainment service, the rate of play may need to be maintained by the player in order to maintain access to the entertainment service. Alternately, criteria for maintaining access to an entertainment service may be different than criteria for initially gaining access to the entertainment service. For example, a first rate of play may need to be achieved to initially gain access to an entertainment service while a second rate of play (e.g., a rate of play that is a higher rate of play or a lower rate of play than the first rate of play) may need to be maintained by the player in order to maintain access to the entertainment service.

As previously indicated, in an illustrative embodiment, the establishment-specific criteria will maintain entertainment services for (i) all players on certain classes of gaming devices, regardless of the player's current level of play; (ii) certain players based on their prior playing history, regardless of the player's current level of play, (iii) for those players whose current level of play meets or exceeds a predefined threshold, and (iv) for those players who provide a cash payment or player reward points awarded as part of a slot club or an arcade incentive program.

In one or more embodiments, if the establishment-specific criteria for maintaining access to the entertainment service is not being met, a disconnection warning may be transmitted to the player with information on how the connection to the entertainment service can be maintained by the player. For example, the player may be informed that a connection to the entertainment service may be maintained by (i) complying with predetermined level of play requirements to maintain complimentary access; (ii) depositing coins in the gaming device or otherwise providing an additional payment; or (iii) allowing a deduction of earned credits from current play prizes or player reward points. These are examples of establishment-specific criteria for maintaining access to an entertainment service. They may also be examples of predetermined criteria for initially qualifying for access to an entertainment service. In other words, a predetermined level of play is an example of an establishment-specific criteria (whether for gaining or for maintaining access to an entertainment service), as is payment for content.

In one or more embodiments, after receiving the disconnection message, the connection to the entertainment service (e.g., or the output of the entertainment service, if the content comprising the entertainment service is stored locally at a gaming device or peripheral device associated with the gaming device) may be terminated if the player does not perform one of the indicated steps for maintaining the connection. Once the access to the entertainment service is terminated, an entry of the connection session may be made in a connection record database (described below).

A more complete understanding of the present invention, as well as further features and advantages of the present invention, will be obtained by reference to the following detailed description and drawings.

FIG. 1A shows an illustrative network environment for transferring multimedia information, such as video, audio and data, between a content provider, such as content providers 115, 120, 125, and one or more electronic gaming devices, such as slot machine 300, over one or more external networks 140, 145, 150. According to a feature of the present invention, the content providers, such as providers 115, 120 and 125, provide players with access to entertainment services. An entertainment service, as used herein, is a service for which a fee is specifically charged (e.g., to the establishment in which the gaming device is located and/or to the player playing the gaming device) for the use of that service, including web sites, pay-per-view services and shared-revenue telephone services, such as 900 or 976 services. It is noted that the fee incurred for a particular premium entertainment service may be a fixed fee for a predefined period of time (in other words, a flat monthly fee), or a variable rate based on the amount of usage of the entertainment service.

According to one or more embodiments of the invention, discussed below, access to the entertainment services can be provided to a player on a complimentary basis, as an incentive for continued play, as a prize in lieu of, or in addition to, a cash payout, or in exchange for a cash payment or player reward points awarded as part of a slot club or an arcade incentive program.

The term "gaming device" as used herein refers to any programmable gaming terminal controlling a random or pseudo-random event in which one or more players can bet on the outcome of the event. Examples of gaming devices include slot machines (e.g., mechanical reel or electronic reel), video bingo, video keno, video poker and video blackjack devices, or arcade video games such as Mortal Kombat™, NBA Jam™, or Virtua Fighter™. While the gaming device 300 is illustrated as a slot machine in the embodiment shown in FIG. 3 and discussed herein, another electronic gaming device, such as a video arcade game, could be substituted therefore, as would be apparent to a person of ordinary skill. In the illustrative embodiment shown in FIG. 1A, the gaming device 300 accesses the external networks 140, 145, 150, indirectly via a network server 110, discussed further below in conjunction with FIG. 2. It is noted that the functionality provided by the network server 110 for connecting the gaming device 300 to the remote content providers 115, 120, 125, as discussed below, could be provided directly in the gaming device 300 itself, as would be apparent to a person of ordinary skill. In this manner, a gaming device 300 could directly access a desired content provider 115, 120, 125, via the external networks 140, 145, 150. The network server 110 and the gaming device 300, discussed further below in conjunction with FIGS. 2 and 3, respectively, may comprise conventional hardware and software, as modified herein to carry out the functions and operations described below. In the embodiment illustrated in FIG. 1B, a gaming device communicated with one or more content providers (e.g., such as content provider 115, 120, and/or 125) directly, without establishing the communication through a network server 110. In the embodiment illustrated in FIG. 1C, a content provider (e.g., such as content provider 115, 120, and/or 125) may be communicated with by a gaming device, a computer (e.g., network server 110), a peripheral device associated with a gaming device, and/or a peripheral device server in order to provide to a player access to an entertainment service.

The network server 110, gaming device 300, a peripheral device, and a peripheral device server may transmit data (e.g., digitally encoded data) and other information between one another. The transmitted data and other information may represent player name and identification number, play results (e.g., particular outcomes obtained by the player and/or statistical information regarding a player's gaming session), authenticated player identification, a menu of entertainment services and player selections, and the multimedia entertainment service content (e.g., a file comprising a movie or portion of a movie). The communications link between any of the devices illustrated in the systems of FIGS. 1A, 1B, and 1C may comprise a cable or wireless link on which electronic signals can propagate. Note that although FIG. 1A shows only one gaming device 300, a plurality of gaming devices may be in communication with a network server 110, each identified by a unique gaming device identifier. It is noted that each content provider, such as content providers 115, 120, 125, may employ a computer, for communicating with the network server 110. The computer of each content provider 115, 120, 125 may comprise, for example, of a processing unit, a modem, memory means and any required audio/video hardware and software.

The television network 140, as used herein, includes a wireless broadcast network for distribution of video programming, such as a digital satellite service ("DSS"), as well as a conventional wired cable television network ("CATV"). The entertainment services accessed via the television network 140 include pay-per-view video programming.

The telephone network 145, as used herein, includes the combination of local and long distance wire or wireless facilities and switches known as the public switched telephone network ("PSTN"), as well as cellular network systems and the telephony feature of the Internet. The entertainment services accessed via the telephone network 145 include shared-revenue telephone services, such as 900 or 976 services. As is well known, shared-revenue telephone services deliver a particular service over the telephone and subsequently bill the caller. The caller is typically identified by the phone number from which the call is made, with the subsequent bill then included as part of the caller's regular telephone bill. The content provider typically calculates the amount of the bill after the service has been delivered. This amount is forwarded to the billing telephone company, which both bills and collects the appropriate amount from the caller. The telephone company typically deducts a portion of the total fee for the service in return for both the cost of making the telephone connection and for the telephone company's role as bill collector.

The Internet network 150, as used herein, includes the World Wide Web (the "Web") and other systems for storing and retrieving information using the Internet. To view a web site, the user communicates an electronic Web address, referred to as a Uniform Resource Locator ("URL"), associated with the web site. In one embodiment, a player can be presented with a list or menu of available web sites, with the corresponding URL preprogrammed for each site. The player thereafter enters his selection of a desired web site, which selection may be transmitted to the network server 110 or accessed by the gaming device being played by the player. A web browser software product, such as Netscape Navigator™ or Microsoft Internet Explorer™, may then access the web site by communicating with the appropriate server, in a known manner. The entertainment services accessed via the Internet network 150 include web sites such as ESPNET Sportszone™.

Figure 1B:
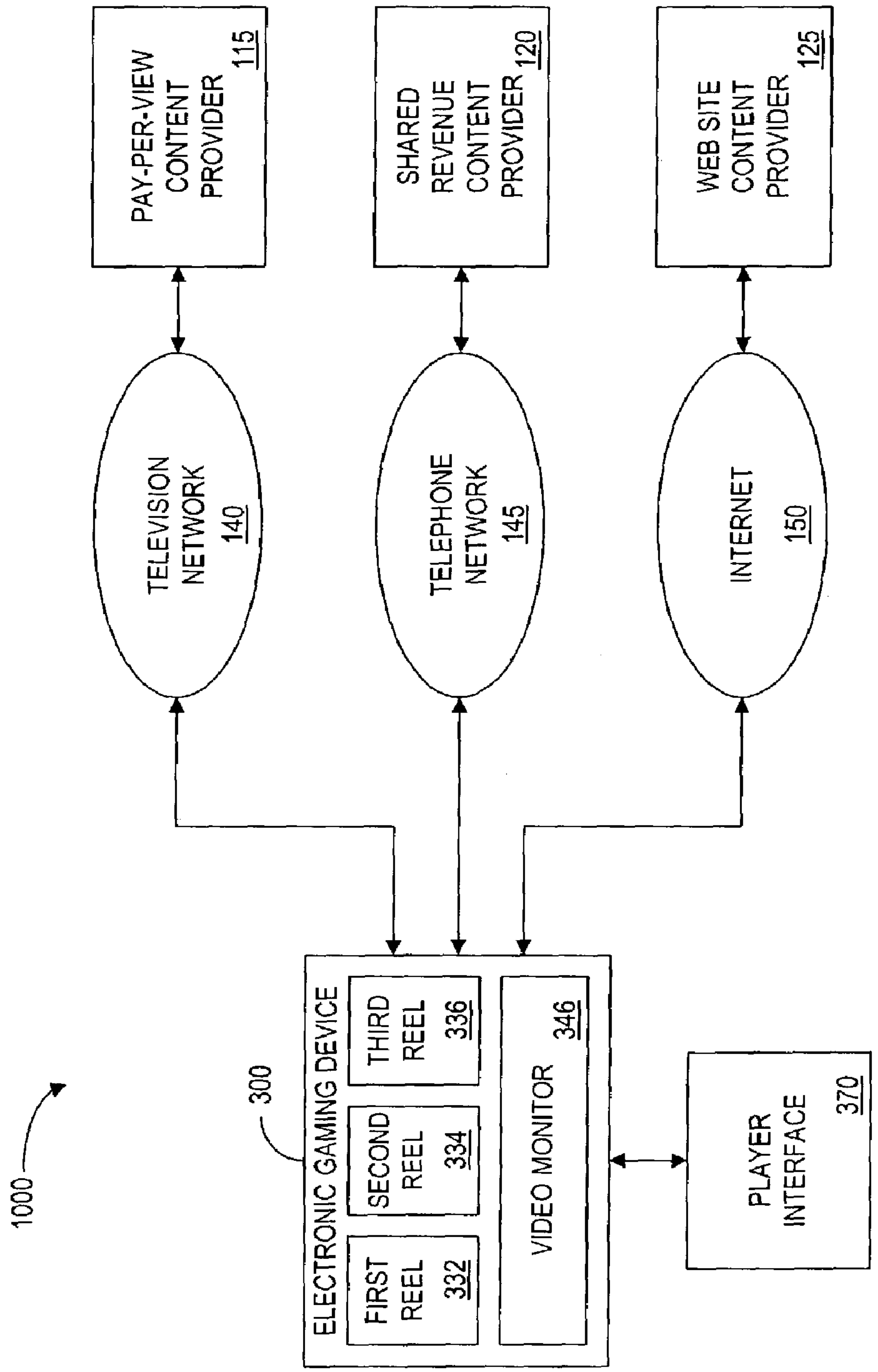
FIG. 1B is a schematic diagram of a system consistent with one or more embodiments of the present invention.

FIG. 1B illustrates an alternate system 1000, consistent with one or more embodiments of the present invention. System 1000 includes components similar to those of the system of FIG. 1A. Accordingly, a component of system 1000 that is similar to a component of the system of FIG. 1A (e.g., gaming device 300) may be operable to perform similar functions in both systems. A difference between the system 1000 and the system of FIG. 1A is that in system 1000 a gaming device 300 is operable to communicate direction with one of the content providers 115, 120, and 125 using television network 140, telephone network 145, and the Internet 150, respectively. In other words, a difference between system 1000 and the system of FIG. 1A is that a gaming device 300 in system 1000 may gain access to an entertainment service or communicate with a content provider without establishing such communication through network server 110. Note that, in system 1000, a gaming device 300 may still be in communication with network server 110 for purposes other than establishing communication with a provider of an entertainment service such as content provider 115, 120, and 125. Note further that, in an alternate embodiment, a gaming device 300 may establish communication with a content provider such as content provider 115, 120, and 125 via a network (not shown). Such a network may comprise, for example, an intranet of the establishment in which the gaming device is located.

Figure 1C:
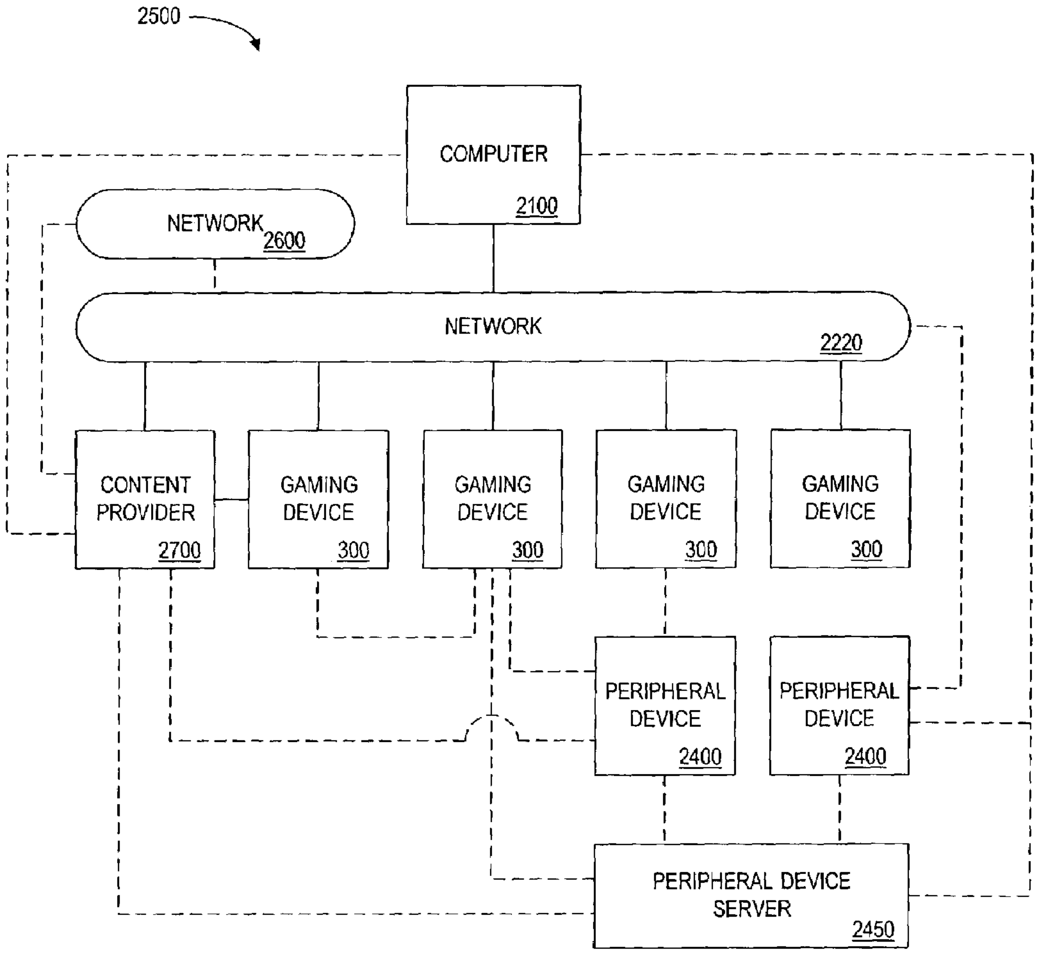
FIG. 1C is a schematic diagram of a system consistent with one or more embodiments of the present invention.

FIG. 1C illustrates yet another alternate system 2500, consistent with one or more embodiments of the present invention. The system 2500 includes a computer 2100 (e.g., a network server of a casino similar to the network server 110 of FIG. 1A) that is in communication, via a communications network 2200, with one or more gaming devices 300 (e.g., slot machines, video poker machines). A difference between the systems of FIG. 1A and FIG. 1B and system 2500 (FIG. 1C) is that in system 2500 at least one gaming device 300 is also in communication with one or more peripheral devices 2400. A peripheral device 2400 may, in turn, be in communication with a peripheral device server 2450 and, in some embodiments, with computer 2100. In one or more embodiments the peripheral device server 2450 may be in communication with one or more gaming devices 300 and/or computer 2100.

System 2500 also includes a content provider device 2700. Content provider device 2700 may comprise a device of a content provider 115, 120, or 125 (FIG. 1A and FIG. 1B). Further, although only one content provider device 2700 is illustrated in FIG. 1C, any number of content provider devices may be used. Any and all of the other devices of system 2500 (i.e., computer 210, a gaming device 300, a peripheral device 2400, and/or the peripheral device server 2450) may communicate with content provider device 2700. Such communication may be direct, or via a network. If the communication is via a network, the network may comprise the network 2200 and/or the network 2600. The network 2200 may comprise, for example, an intranet of an establishment in which the gaming devices 300 are located. The network 2600 may comprise, for example, an external network. In one embodiment, the network 2600 may comprise any and all of the television network 140, the telephone network 145, and the Internet 150 (FIG. 1A and FIG. 1B).

The computer 2100 may communicate with the devices 300 and devices 2400 directly or indirectly, via a wired or wireless medium such as the Internet, LAN, WAN or Ethernet, Token Ring, or via any appropriate communications means or combination of communications means. For example, the computer 2100 may communicate directly with one of the gaming devices 300 (e.g., via a LAN) and indirectly (e.g., via a gaming device 300) with a peripheral device 2400. In another example, the computer 2100 may communicate with one of the gaming devices 300 via a LAN and with another of the gaming devices 300 via the Internet (e.g., if the particular gaming device comprises a personal computer in communication with an online casino).

Each of the devices 300 and the peripheral devices 2400 may comprise computers, such as those based on the Intel® Pentium® processor, that are adapted to communicate with the computer 210. Further, each of the devices 300 may comprise a gaming device such as a mechanical or electronic slot machine, a video poker machine, a video blackjack machine, a video keno machine, a pachinko machine, a video roulette machine, and/or a lottery terminal. Further yet, each of the devices 2400 may comprise an external or internal module associated with one or more of the gaming devices 300 that is capable of communicating with one or more of the gaming devices 300 and of directing the one or more gaming devices 300 to perform one or more functions. Any number of devices 300 maybe in communication with the computer 2100. Any number and type of peripheral devices 2400 may be in communication with a gaming device 300, peripheral device server 2450 and computer 2100.

Communication between the gaming devices 300 and the computer 2100, between the gaming devices 200 and peripheral devices 2400, between peripheral device server 2450 and the peripheral devices 2400 and/or the gaming devices 300, between the peripheral device server 2450 and computer 2100, among the gaming devices 300, and among the peripheral devices 2400 may be direct or indirect, such as over the Internet through a Web site maintained by computer 2100 on a remote server or over an on-line data network including commercial on-line service providers, bulletin board systems and the like. In yet other embodiments, any and all of the devices of system 2500 (i.e., the gaming devices 300, the peripheral devices 2400, the computer 2100, and the peripheral device server 2450) may communicate with one another over RF, cable TV, satellite links and the like.

Some, but not all, possible communication networks that may comprise network 2200 and/or network 2600 or otherwise be part of system 2500 include: a local area network (LAN), a wide area network (WAN), the Internet, a telephone line, a cable line, a radio channel, an optical communications line, a satellite communications link. Possible communications protocols that may be part of system 2500 include: Ethernet (or IEEE 802.3), SAP, ATP, Bluetooth™, and TCP/IP. Communication may be encrypted to ensure privacy and prevent fraud in any of a variety of ways well known in the art.

In an embodiment, the computer 2100 may not be necessary and/or preferred. For example, the present invention may, in one or more embodiments, be practiced on a stand-alone gaming device 300, one or more gaming devices in communication with one or more peripheral devices 2400, one or more gaming devices in communication with peripheral device server 2450, one or more peripheral devices 2400 in communication with peripheral device server 2450, and/or a gaming device 300 in communication only with one or more other gaming devices 300. In such an embodiment, any functions described as performed by the computer 2100 or data described as stored in a memory of the computer 2100 may instead be performed by or stored on one or more gaming devices 300, one or more peripheral devices 2400, and/or peripheral device server 2450.

Similarly, peripheral device server 2450 may not be desired and/or needed in some embodiments of the present invention. In embodiments that do not involve peripheral device server 2450, any or all of the functions described herein as being performed by peripheral device server 2450 may instead be performed by computer 2100, one or more gaming devices 300, one or more peripheral devices 2400, or a combination thereof. Similarly, in embodiments that do not involve peripheral device server 2450 any data described herein as being stored in a memory of peripheral device server 2450 may instead be stored in a memory of computer 2100, one or more gaming devices 300, one or more peripheral devices 2400, or a combination thereof.

Any or all of the gaming devices 300 may, respectively, include or be in communication with a peripheral device 2400. A peripheral device 2400 may be a device that receives information from (and/or transmits information to) one or more gaming devices 300. For example, a peripheral device 2400 may be operable to receive information about games being played on a gaming device 300, such as the initiation of a game and/or a random number that has been generated for a game.

In one or more embodiments, one or more such peripheral devices 2400 may be in communication with a peripheral device server 2450. This allows the peripheral device server 2450 to receive information regarding a plurality of games being played on a plurality of gaming devices 300. The peripheral device server 2450, in turn, may be in communication with the computer 2100. It should be understood that any functions described herein as performed by a peripheral device 2400 may also or instead be performed by the peripheral device server 2450. Similarly, any data described herein as being stored on or accessed by a peripheral device 2400 may also or instead be stored on or accessed by the peripheral device server 2450.

A peripheral device 2400 may be operable to access a database (e.g., of peripheral device server 245) to provide access to an entertainment service based on, for example, a level of play associated with a player.

The peripheral device server 2450 may also monitor player gambling history over time by associating gambling behavior with player identifiers, such as player tracking card numbers. For example, in embodiments wherein a player selects a type of entertainment service to access (e.g., a web site versus a broadcast television channel), the peripheral device server 2450 may track which type of entertainment service the player previously selected and subsequently use that information to present types of entertainment services to the player (e.g., the information may be used to select which available entertainment services are to be included in a menu of available entertainment services to be output to a player). Further, information about the player obtained or accessed by peripheral device server 2450 may be analyzed, e.g., to identify those players that a particular gaming machine owner, operator, or manufacturer finds most desirable. Based upon desired objectives, the peripheral device server 2450 may direct the appropriate peripheral device 2400 to issue customized messages (e.g., offering particular entertainment services) to specific players that are relevant to their gambling behaviors.

Information received by a peripheral device 2400 from a gaming device 300 may include gambling data such as number of games initiated per unit of time, wager amount for a particular game play, outcomes displayed for games initiated, payouts corresponding to outcomes displayed, a credit meter balance of the gaming device, and/or data associated with the player currently playing the gaming device 300. Such data may be utilized, for example, to determine whether a player has satisfied one or more establishment-specific criteria for accessing one or more entertainment services.

The functions described herein as being performed by a peripheral device server 2450 and/or a peripheral device 2400 may, in one or more embodiments, be performed by the computer 2100 (in lieu of or in conjunction with being performed by a peripheral device server 2450 and/or a peripheral device 2400).

In one or more embodiments, a peripheral device 2400 may be useful for implementing the embodiments of the present invention into the operation of a conventional gaming device. For example, in order to avoid or minimize the necessity of modifying or replacing an interface, cabinet, or program already stored in a memory of a conventional gaming device, an external or internal module that comprises a peripheral device 2400 may be inserted in or associated with the gaming device.

Thus, for example, a peripheral device 2400 may be utilized to monitor play of the gaming device and output messages (e.g., offers for and menus of available entertainment services, or indications of a player's status regarding qualifying for access to an entertainment service). In such embodiments the gaming device 300 with which the peripheral device 2400 is in communication with may continue to operate conventionally. The peripheral device 2400 may also provide access to an entertainment service (e.g., by displaying the content comprising the entertainment service). Note that, in one or more embodiments, a gaming device 300 may not communicate with a peripheral device 2400. Instead, a peripheral device 2400 may monitor activities of the gaming device 300.

A peripheral device 2400 may include (i) a communications port (e.g., for communicating with one or more gaming devices 300, peripheral device server 2450, another peripheral device 2400, and/or computer 2100); (ii) a display (e.g., for displaying messages and/or outcomes), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device 2400 associated with a gaming device 300 may not output messages and/or content comprising an entertainment service to a player but may instead direct the processor of the gaming device 300 to perform such functions. For example, a program stored in a memory of peripheral device 2400 may cause a processor of a gaming device 300 to perform certain functions. For example, a program stored in a memory of peripheral device 2400 may cause a processor of a gaming device to initiate communications with a content provider of entertainment services or with computer 210 in order to gain access to entertainment services or to output content comprising an entertainment service.

Figure 2:
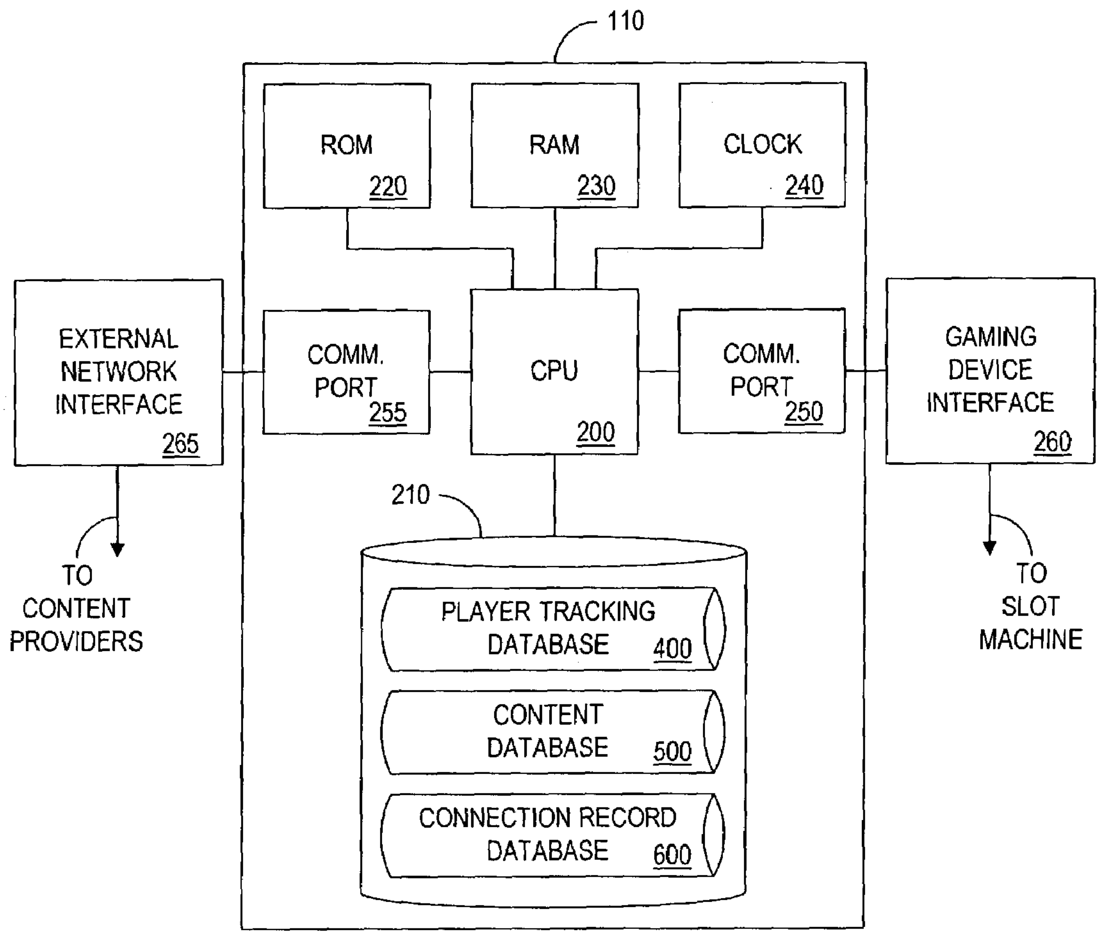
FIG. 2 is a schematic block diagram of the network server of FIG. 1.

FIG. 2 is a block diagram showing the architecture of an illustrative network server 110 (or of computer 2100). The network server 110 may be embodied, for example, as an RS 6000 server, manufactured by IBM Corp., as modified herein to execute the functions and operations of the present invention. The network server 110 may include certain standard hardware components, such as a central processing unit (CPU) 200, a data storage device 210, a read only memory (ROM) 220, a random access memory (RAM) 230, a clock 240, and communications ports 250, 255. The CPU 200 may be in communication with each of the other listed elements, by means of, for example, a shared data bus or dedicated connections, as shown in FIG. 2.

The CPU 200 may be embodied as a single processor, or a number of processors. The data storage device 210 and/or ROM 220 are operable to store one or more instructions, as discussed below in conjunction with FIGS. 7A through 7C, which the CPU 200 is operable to retrieve, interpret and execute. The CPU 200 may include a control unit, an arithmetic logic unit (ALU), and a CPU local memory storage device, such as, for example, a stackable cache or a plurality of registers, in a known manner. The control unit is operable to retrieve instructions from the data storage device 210 or ROM 220. The ALU is operable to perform a plurality of operations needed to carry out instructions. The CPU local memory storage device is operable to provide high speed storage used for storing temporary results and control information.

As discussed further below in conjunction with FIGS. 4 through 6, the data storage device 210 includes a player tracking database 400, a content database 500, and a connection record database 600. Note that, in one or more embodiments, any and all of these databases (as well as any and all data stored therein) may be stored at another device in lieu of or in addition to being stored at network server 110. For example, any and all of the databases or data stored therein may be stored in the memory of a gaming device 300, a peripheral device 2400 associated with the gaming device, and/or a peripheral device server 2450.

The player tracking database 400 may store, for example, historical information on each player, including an indication of his gaming activity. The content database 500 may store, for example, information associated with (e.g., by the network server 110, a gaming device, or a peripheral device) one or more entertainment services. For example, content database 500 may store information required to access the selected content provider, such as the appropriate external network and network address to be utilized, as well as any required account number and/or password. The connection record database 600 may store information associated with, for example, one or more connection sessions established by the network server 110, a gaming device or a peripheral device to an entertainment service. For example, connection record database 600 may store an indication of the duration or estimated cost of a connection session.

The communications port 250 connects the network server 110 to a gaming device interface 260, thereby linking the network server 110 to one or more gaming devices, such as the slot machine 300 shown in FIG. 1. The communications port 255 connects the network server 110 to an external network interface 265, thereby linking the network server 110 to one or more external networks, such as the networks 140, 145, 150 shown in FIG. 1. The communication ports 250, 255 preferably include multiple communication channels for simultaneously connecting multiple players to multiple content providers 115, 120, 125.

Figure 3:
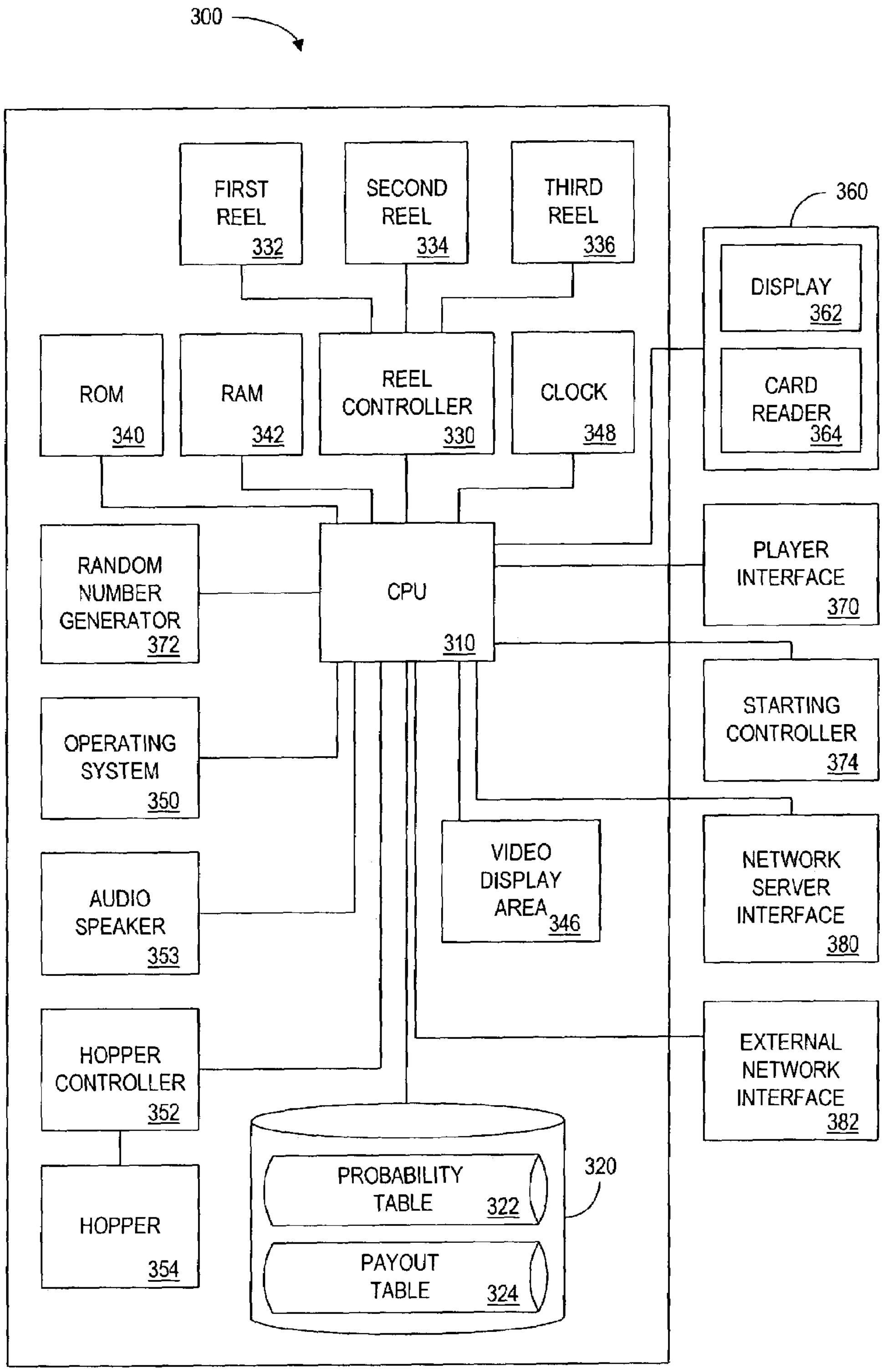
FIG. 3 is a schematic block diagram of a gaming device of FIG. 1.

FIG. 3 is a block diagram showing the architecture of an illustrative gaming device 300. Although gaming device 300 is illustrated as comprising a three reel slot machine, as described above, a gaming device operative to perform any and all of the embodiments of the present invention may comprise another type of gaming device (e.g., an electronic reel slot machine, a video poker machine, a blackjack device, or an arcade game). The gaming device 300 may include certain standard hardware components, such as a CPU 310, a data storage device 320, a ROM 340, a RAM 342, and a clock 348. The CPU 310 may be linked to each of the other listed elements, either by means of a shared data bus, or dedicated connections, as shown in FIG. 3. The CPU 310 executes program modules stored in the data storage device 320 or the ROM 340 to perform the processes described below, in a known manner.

With respect to gaming operations, gaming device 300 performs in a conventional manner. A player initiates a game play at the gaming device 300 by providing a form of payment, for example, by depositing coins, or inserting a credit card, debit card or smart card, and pressing a starting controller 374. Under control of a program stored, for example, in the data storage device 320 or ROM 340, the CPU 310 initiates the random number generator 372 to generate a number. The CPU 310 looks up the generated random number in a stored probability table 322 and finds the corresponding outcome, or game result. Based on the identified outcome, the CPU 310 locates the appropriate payout in a stored payout table 324. The CPU 310 also directs a reel controller 330 to spin the reels 332, 334, 336 and to stop them at a point when a combination of symbols corresponding to the selected payout is displayed. When the player wins, the gaming device 300 stores the credits in a random access memory (RAM) 342 and displays the available credits in a video display area 346.

A hopper controller 352 is connected to a hopper 354 for dispensing coins. When the player requests to cash out by pushing a button on the slot machine 300, the CPU 310 checks the RAM 342 to see if the player has any credit and, if so, signals the hopper 354 to release an appropriate number of coins into a payout tray (not shown).

In alternative embodiments, the gaming device 300 does not include the reel controller 330, or reels 332, 334, 336. Instead, the video display area 346 graphically displays representations of objects contained in the selected game, such as graphical reels or playing cards. These representations may be animated to display playing of the selected game.

A player tracking device 360 is also in communication with the CPU 310. The player tracking device 360 comprises a card reader 364 for reading player identification information stored on a player tracking card (not shown), which may be encoded with information to identify the player, in a known manner. The player tracking device 360 also preferably includes a display 362, having a touch screen, or associated player interface 370. Suitable commercially available player card tracking devices include, for example, the Mastercom™ device available from Bally Manufacturing™. (See, for example, U.S. Pat. No. 5,429,361 to Raven et al.). Such player tracking devices include a magnetic card reader and a numeric keypad for entry of player information.

The gaming device 300 also includes a network server interface 380 which provides a communication path between the slot machine 300 and the network server 110. Thus, as discussed further below, information may be communicated among the player tracking device 360, gaming device 300 and network server 110.

The gaming device 300 also includes an external network interface 382. External network interface 382 may be similar to the external network interface 265 (FIG. 2) and enable the gaming device 300 to communicate with a device external to the establishment in which the gaming device is located or external to any intranet on which the gaming device 300 may be located. For example, in an embodiment where a gaming device 300 is operable to communicate with a content provider (e.g., such as a content provider 115, 120, and 125) without relying on network server 110 to establish such communication, the gaming device 300 may establish such communication via external network interface 382.

Once play is initiated by a player, in the manner described above, the gaming device 300 may display a menu of available entertainment services on the display 362 or video display area 346, and may prompt the player to select a desired entertainment service, for example, using the player interface 370. Alternately, a menu of available entertainment services may not be displayed to a player until a player has qualified for at least one of the entertainment services (e.g., if a level of play of the player satisfies one or more establishment-specific criteria corresponding to the entertainment services). Note that, in one or more embodiments, the menu of entertainment services may include an indication of the level of play necessary to qualify for access to each respective entertainment service.

According to one or more embodiments of the present invention, the gaming device 300 is capable of presenting entertainment service received from one or more content providers 115, 120, 125 to a player at the gaming device 300. As previously indicated, the entertainment service received from the content provider may be multimedia information, including video, audio and/or data information. Thus, the gaming device 300 may be capable of presenting such multimedia information to a player. Thus, in addition to the video display area 346, which may be utilized to display the video and data information, the gaming device 300 may include an audio speaker or headset 353. In an alternate embodiment, a peripheral device 2400 associated with (e.g., in communication with and/or located proximate to) a gaming device 300 may include a video display area and audio content delivery capability via which an entertainment service may be provided.

In one or more embodiments, the gaming device 300 may include a means for presenting the player with an integrated display of the multimedia information associated with the entertainment service, together with the gaming result, for example, by means of a virtual reality (VR) headset (not shown). In this manner, all of the entertainment content intended for the player, including the game result and the premium entertainment service, is presented through the VR headset. A VR headset offers particular advantages since it permits private viewing of a selected entertainment service in a public environment. Alternatively, a pair of glasses which are uniquely "keyed" to the output of the video display area 346, for example, by means of a particular polarization or wavelength, could be configured to provide similar privacy.

As previously indicated, the player tracking database 400, shown in FIG. 4, may store historical information on each player, including an indication of their gaming activity. The player tracking database 400 maintains a plurality of records, such as records 410–412, each associated with a different player. For each player identified by player tracking number in field 420, the player tracking database 400 includes a casino rating in field 425 which may be utilized to characterize the playing history of a player. For example, the casino rating may indicate whether a given player is a "high roller." In addition, the player tracking database 400 may include an indication in field 430 of the recent gaming activity of the player within a predefined historical period (e.g., manifested as a theoretical win of the player), and an indication in field 435 of the current balance of player reward points available to the given player.

In accordance with an embodiment of the present invention, the player tracking database 400 may include an indication in field 440 of the player's preferences with respect to particular entertainment services. In this manner, the menu of available entertainment services which is presented to the player when play is commenced can be tailored to the indicated preferences of the particular player.

Information on one or more available entertainment services may be stored in the content database 500, such as the content database 500 illustrated in FIG. 5. Such information may be utilized by, for example, the network server 110 or another device (e.g., a gaming device 300, a peripheral device 2400 associated with the gaming device, and/or a peripheral device server 2450), to provide to a player access to an entertainment service. The content database 500 maintains a plurality of records, such as records 510–512, each associated with a different entertainment service. For each entertainment service option listed in field 520, the content database 500 includes an indication in field 525 of the appropriate content provider, such as the content provider 125, that provides the respective entertainment service. In addition, the content database 500 may contain any information which is required by a device to access each entertainment service. For example, in one embodiment, the content database 500 stores access information in field 530, an account number in field 535 and a password in field 540. Note that the information stored in content database 500 that may be required to gain access to an entertainment service is different from any establishment-specific criteria that are to be satisfied in order for a player to gain access to a given entertainment service.

For example, if a particular entertainment service is a web site, the access information stored in field 530 may indicate that the web site is accessed via the Internet 150, and may contain the appropriate URL address. Similarly, if an entertainment service is a shared-revenue telephone service, the access information stored in field 530 may indicate that the shared revenue telephone service is accessed via the telephone network 145, and contain the appropriate 900 or 976 telephone number. Finally, if the entertainment service is a pay-per-view movie selection, the access information may indicate that the pay-per-view movie is accessed via a cable (or wireless) television network, such as the network 140, and contain the appropriate cable television channel number.

In one embodiment, the content database 500 also includes cost information in field 545 for one or more entertainment services. The cost information may comprise information that permits the casino to maintain estimated cost information for each connection session and to also implement variable per minute rates for one or more entertainment services. The cost information may comprise an indication of what the casino or other establishment in which a gaming device is located may be required to pay for providing an entertainment service to a player, but not necessarily what a player would be required to pay for accessing the entertainment services. In one or more embodiments, for example, a casino may provide to a player access to one or more entertainment services as a reward for the player's engagement in an activity that benefits the casino (e.g., achieving and maintaining a predetermined rate of play of a gaming device for at least a predetermined duration). The player may not be required to provide payment for access to the entertainment service other than qualifying for the access by engaging in the activity that benefits the casino. However, the casino may be required to pay a provider of the entertainment service for the access. Accordingly, in one or more embodiments, a casino may take into account any costs that will be incurred by the casino in providing access to the entertainment service (e.g., such as any payment for the entertainment service that will be required by a provider of the service) when setting any establishment-specific criteria that a player is to satisfy in order to gain access to the entertainment service. For example, a required rate of play may be set such that the expected profit derived by the casino from the rate of play being maintained is at least sufficient (e.g., or exceeds by a predetermined amount) to cover the expected costs of providing access to the entertainment service.

In one or more embodiments, the content database 500 may also store one or more files (or groups of files) comprising the content (or information pointing to where such files are stored in memory) that is the entertainment service to be provided to a player. For example, one type of content comprising an entertainment service that may be provided to a player is a movie, portion of a movie, a music video, an interview (audio and/or video) with a celebrity, or an audio file of a song. In one or more embodiments, one or more files (e.g., an mpg file) containing the content may be stored in the content database 500 or another database. In such embodiments, the content database or other database storing such one or more files may be stored in a gaming device 300, a peripheral device 2400, a peripheral device server 2450, or computer 2100 (e.g., network server 110). In such embodiments, if a player qualifies for access to the content stored in the one or more files, the one or more files may be retrieved from memory and the content output to the player.

As previously indicated, the network server 110 (e.g., or another device such as a gaming device 300, a peripheral device 2400 associated with the gaming device, and/or a peripheral device server 2450) may maintain a connection record database 600, shown in FIG. 6, for storing information on each connection session to a premium entertainment service. The connection record database 600 maintains a plurality of records, such as the records 610–612, each associated with a different connection session made by the network server 110 to an entertainment service. For each connection session listed in field 620, the connection record database 600 preferably stores the player tracking number of the player who requested the connection in field 625, and the date, time and duration of the connection in fields 630, 635 and 640, respectively. In addition, the connection record database 600 may store an indication of the identity of the content provider that provides a particular entertainment service associated with the connection in field 645 and an indication of the estimated cost of the connection in field 650. In this manner, the casino has recorded the appropriate information which may be required to verify any contested charges.

As discussed further below in conjunction with FIGS. 7A through 7C, the processes performed by a device (e.g., by the network server 110, a gaming device 300, a peripheral device 2400 associated with the gaming device, and/or a peripheral device server 2450) in accordance with one or more embodiments of the present invention, may require the network server 110 to interact with one or more gaming devices 300, one or more peripheral devices 2400, peripheral device server 2450, and one or more content providers, such as the content providers 115, 120, 125. For example, in accordance with one or more embodiments, when the network server 110 is notified that play has commenced at a particular gaming device 300, the network server 110 may evaluate establishment-specific criteria to determine whether the player of the gaming device 300 should be offered access to entertainment services while playing. It is noted that the functionality provided by the network server 110, including the programs described below in conjunction with FIGS. 7A through 7C, could be performed directly by a gaming device 300 or another device (e.g., by the network server 110, a peripheral device 2400 associated with the gaming device 300, and/or a peripheral device server 2450), as would be apparent to a person of ordinary skill after reading the present disclosure.

Figure 7A:
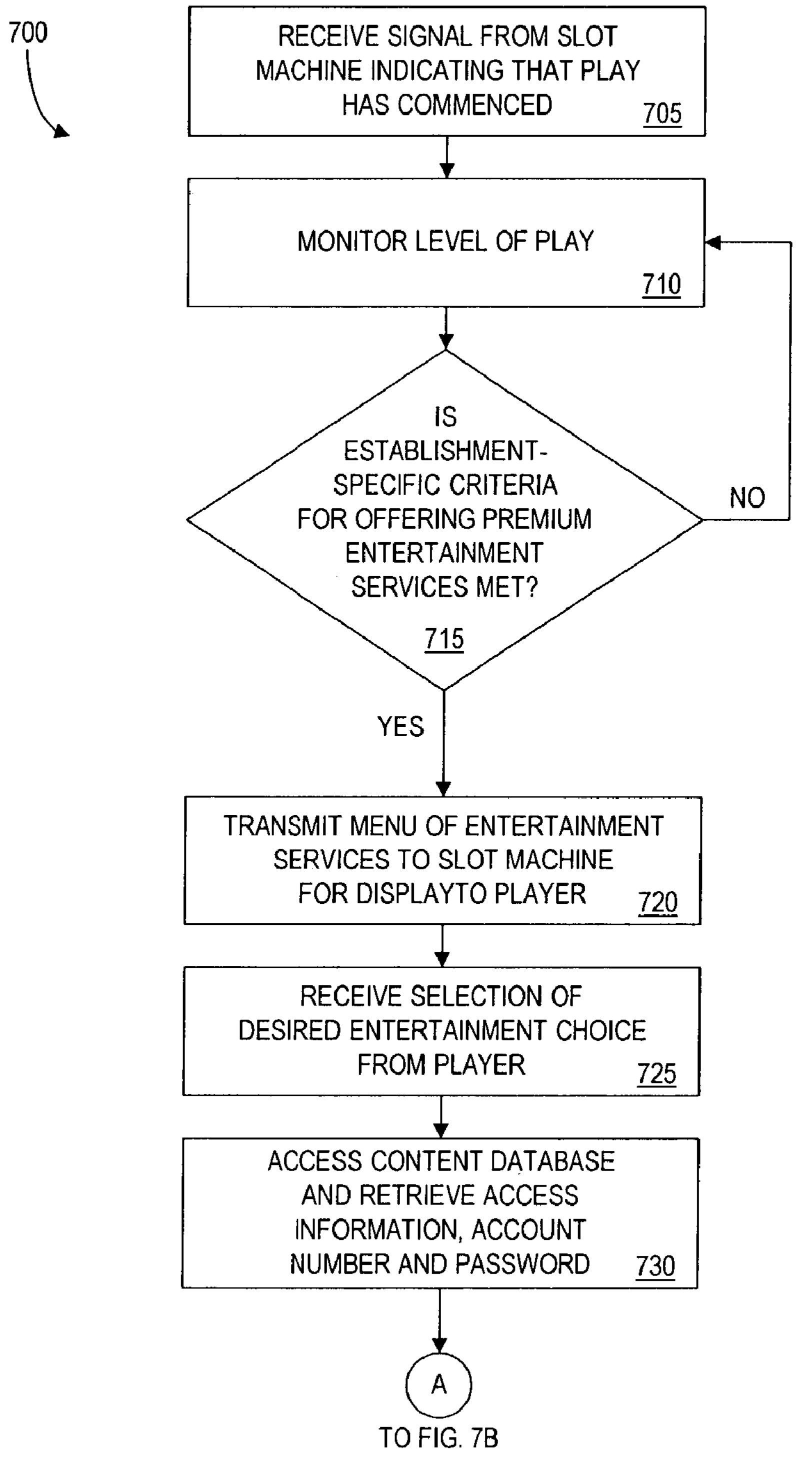
FIGS. 7A through 7C, collectively, are a flow chart describing an exemplary process for evaluating whether a player has qualified for access to a premium service, consistent with one or more embodiments of the present invention.
Figure 7B:
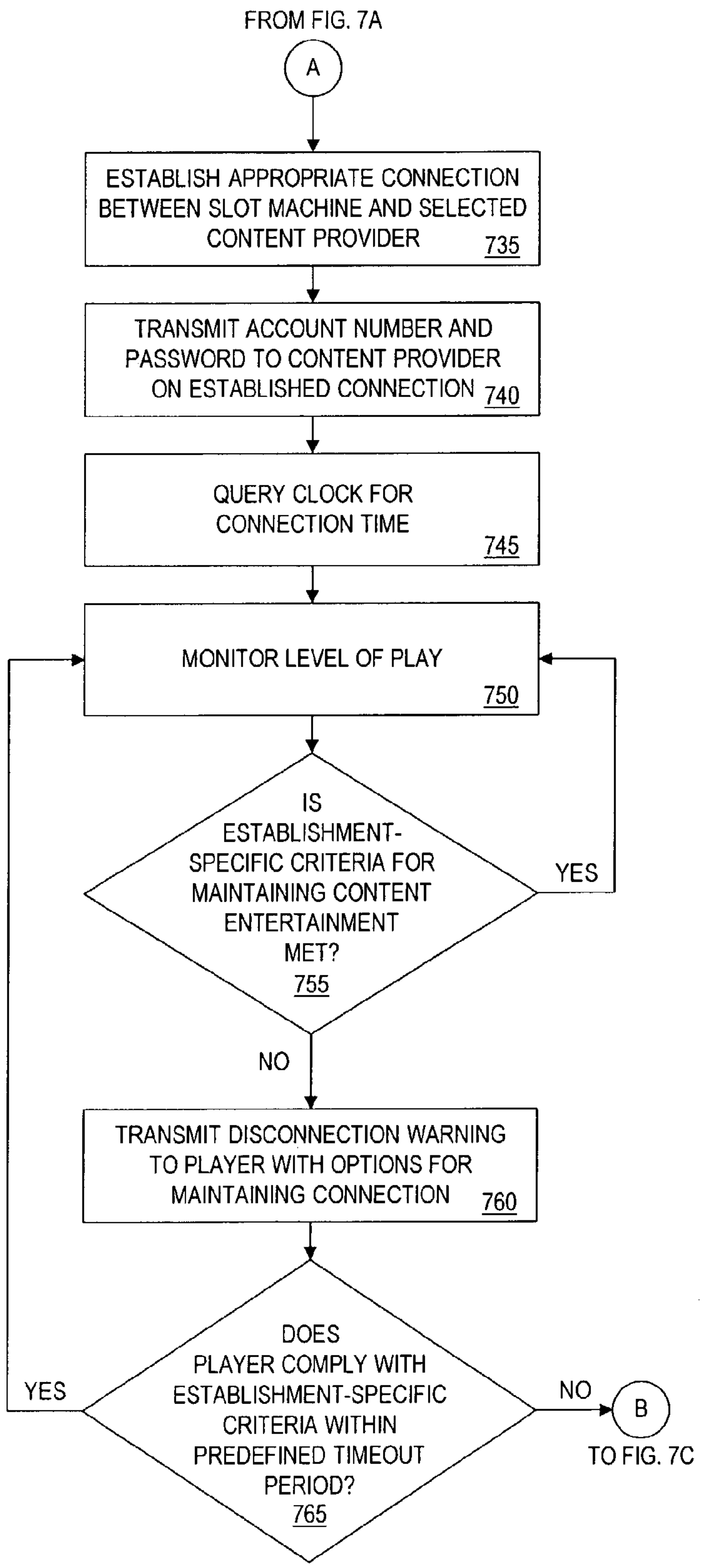
Figure 7C:
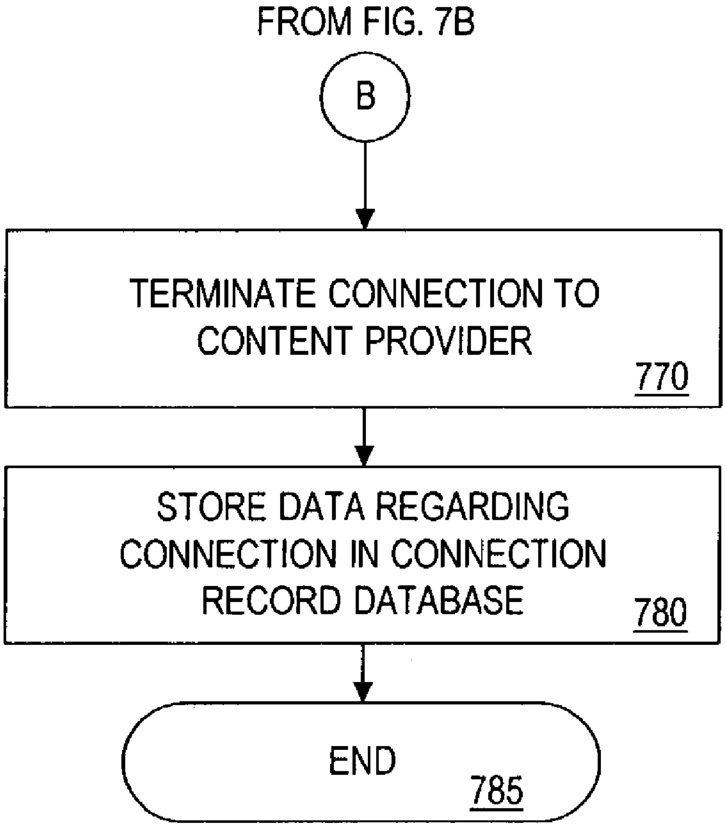

As illustrated in FIGS. 7A through 7C, a flowchart illustrates a process 700 that may be performed by one or more devices in accordance with one or more embodiments of the present invention. The process 700 may begin with step 705, upon initiation by a player of a game play at a gaming device 300. The level of play may be monitored (e.g., by the network server 110, a gaming device 300, a peripheral device 2400 associated with the gaming device, and/or a peripheral device server 2450) during step 710 to determine whether this player is entitled to access the entertainment services.

Thus, a test may be performed during step 715 to determine if the establishment-specific criteria for offering players access to the entertainment services is met. For example, in one illustrative embodiment, the establishment-specific criteria can define circumstances under which access to the entertainment services will be made available to a player. For example, access to one or more entertainment services may be offered or provided to (i) all players whose prior playing history meets predefined criteria, as determined, for example, by accessing the player tracking database 400, (ii) unlimited complimentary usage to all players on certain classes or types of electronic gaming devices, as determined by accessing a record maintained by the network server 110 identifying the machine type for each electronic gaming device, (iii) limited complimentary access to those players whose current level of play meets or exceeds a predefined threshold, as determined by monitoring the current level of play of each player, or (iv) access to those players who provide a cash payment or player reward points awarded as part of a slot club or an arcade incentive program, regardless of any level of play.

A level of play, as used herein unless expressly indicated otherwise, comprises a measurement or other indicator of an activity engaged in by a player. Accordingly, a level of play may comprise a specified activity and a value associated with the activity. In one or more embodiments, access to an entertainment service is qualified based on a predetermined level of play, such that a player may not be allowed access to the entertainment service until the player's level of play meets or exceeds a predetermined level of play. Examples of activities that may comprise a level of play include, but are not limited to, (i) a number of coins played by the player per unit of time (e.g., a sum of wagers placed by a player per hour); (ii) an amount of money the player has won (e.g., a sum of payouts and bonuses obtained by a player during a predetermined period of time), (iii) a length of time the player has played (e.g., two hours) at a particular gaming device; (iv) a length of time the player has played in a particular establishment; (v) an initial credit meter balance the player established at the beginning of a gaming session; (vi) a change in the credit meter balance (e.g., from the time the player initiated a gaming session to a current time); (vii) a current credit meter balance; (viii) a rate of play achieved by the player (e.g., a number of game plays initiated by the player per unit of time); (ix) a profitability of the player to the casino (e.g., as represented by the theoretical win or as based on a comparison of coin-in and coin-out during the player's gaming session or an amount of money spent by the player in the casino during a predetermined period of time); (x) a number of particular gaming devices or games the player has played during a predetermined period of time; and (xi) a number of types of gaming devices or games the player has played during a predetermined period of time.

Note that, when a level of play is set by an establishment as an establishment-specific criteria for obtaining access to an entertainment service, the level of play may indicate not only the type of activity (e.g., rate of play) but also a value to be achieved for the type of activity in order to qualify for access to the entertainment service. Thus, for example, an establishment may specify that if a player achieves a rate of play of twenty game plays per three minute period of time the player is to qualify for access to an entertainment service. Note that, in one or more embodiments, a type of entertainment service (e.g., access to broadcast television) may be associated with one or more particular levels of play. For example, in order to gain access to broadcast television content a player must either achieve a rate of twenty game plays per three minute period of time (a first level of play associated with the entertainment service) or wager a minimum of fifteen coins per minute (a second level of play associated with the entertainment service). Each respective available entertainment service may, in one or more embodiments, be associated with at least one level of play. Note that, in one or more embodiments, more than one piece of content may be available from a particular entertainment service provider or as a particular type of entertainment service. For example, if the entertainment service in question is a movie, a first level of play may be associated with a first category of movie (e.g., movies released more than two years ago) while a second level of play may be associated with a second category of movie (e.g., newly released movies). The first level of play and the second level of play may specify, for example, the same activity (e.g., a rate of play) but different values. In other words, if a player achieves a rate of play of twenty game plays per three minute period, the player may gain access to movies released more than two years ago but if the player achieves a rate of play of thirty game plays per three minute period, the player may gain access to newly released movies. Alternately, the first and second level of play may each define a different type of activity.

If it is determined during step 715 that the establishment-specific criteria for providing or offering players access to one or more entertainment services is not met, program control returns to step 710, and the network server 110 continues monitoring the player's level of play until the establishment-specific criteria for offering players access to the one or more entertainment services is met.

Thus, once it is determined during step 715 that the establishment-specific criteria for providing or offering players access to the one or more available entertainment services is met, program control proceeds to step 720, where the network server 110 transmits a menu of the available entertainment services to the slot machine 300 for display to the player. As described above, in one or more embodiments a gaming device or peripheral device associated with a gaming device may store and display such a menu without involvement of the network server 110.

In one or more embodiments, the player's content preferences are retrieved from the player tracking database 400, and the menu of available entertainment services is tailored to the preferences of the individual. For example, only a subset of available entertainment services may be displayed on the menu, based on the player's preferences. A player's preferences may be determined, for example, based on preferences expressly indicated by the player (e.g., by filling out a survey regarding the player's preferences) or inferentially based on one or more previous entertainment services the player has selected or foregone. In one or more embodiments, a subset of available entertainment services may selected for inclusion on the menu to be displayed to the player based on factors in addition to or other than player preferences. For example, an entity such as the establishment in which the gaming device being played by the player or manufacturer or designer of the gaming device may specify one or more factors based on which such a selection for inclusion may be made. For example, a casino may specify that only the three least costly entertainment services are to be included on the menu, based on the cost of each available service at the time the selection for inclusion is being made. In another example, an entity may specify that one or more particular entertainment services are to be selected for inclusion if a particular level of play is achieved by the player. Regardless of how it is determined which entertainment services are to be included on the menu output to the player, once the menu is output to the player the player is instructed to select one of the services. The process 700 may be paused until such a selection from a player is received in step 725. Note that, in one or more embodiments, if a selection from a player is not received within a predetermined amount of time or a player declines to select any entertainment service (e.g., by selecting a "no thank you" option that may be included on the menu), the gaming device may return to conventional game play rather than continuing to perform the steps of process 700.

Note that, other methods for a player to indicate an interest in obtaining access to an entertainment service (besides selecting an entertainment service from a menu of options displayed to the player) are envisioned. For example, in one embodiment, a player may affirmatively request access to an entertainment service rather than responding to an offer for an entertainment service. For example, in one or more embodiments, one or more mechanisms (e.g., buttons or knobs) or areas of a touchscreen may be located on a gaming device or peripheral device in communication with the gaming device. A player may request access to an entertainment service by actuating one of such mechanisms or areas. In another example, a player may be provided with an entertainment service of the establishment's choosing rather than being offered a menu of available entertainment services.

Note further that, as described above, in one or more embodiments a player may be presented with an indication of one or more entertainment services before the player has qualified for the one or more entertainment services (e.g., before an establishment-specific criteria associated with an entertainment service has been met). In such embodiments, the indication of the one or more entertainment services may include an indication of the establishment-specific criteria respectively associated with one or more of the entertainment services. For example, an indication of a rate of play that the player must achieve in order to gain access to a particular entertainment service may be output to the player. Further, in one or more embodiments a player's current progress towards gaining access to one or more entertainment services may be indicated to the player (e.g., continuously through the gaming session of the player or on a periodic or non-periodic basis). Such an indication of progress may motivate the player into attempting to meet the establishment-specific criteria and thus gain access to the entertainment service. An indication of the player's progress may be output via audio (e.g., a speaker outputting a spoken message, music, or other audio signals indicative of the player's progress) or visually (e.g., via a display of the gaming device or a peripheral device associated with the gaming device). For example, in one embodiment a player may (e.g., at the beginning of a gaming session) indicate an interest in gaining access to a particular entertainment service. For example, the player may select such an entertainment service from a menu of available entertainment services or actuate a mechanism associated with the entertainment service. In response to the player's indication of interest, the establishment-specific criteria associated with the entertainment service may be output to the player along with the player's current level of play. Throughout the player's gaming session, the player's current level of play may continue to be output such that the player is aware of how the player must improve his level of play in order to gain access to the entertainment service.

Returning now to process 700, upon receipt of the desired entertainment choice, the content database 500 may be accessed (e.g., by the network server 110, a gaming device 300, a peripheral device 2400 associated with the gaming device, and/or a peripheral device server 2450) during step 730 and access information retrieved therefrom. For example, an account number, and/or password which is required to access the selected premium entertainment service, including the appropriate external network to be utilized; any required network address (Internet), telephone number (shared revenue telephone services) or cable channel (pay-per-view); and any required account number and/or password may be retrieved. For example, if the player has selected a web site-based premium entertainment service provided by content provider 125, which is accessed via the Internet 150, the network server 110 accesses the appropriate record of the content database 500 and retrieves the appropriate stored access information, including the URL address associated with the web site.

Thereafter, during step 735 (FIG. 7B) the information retrieved during the previous step may be utilized (e.g., by the network server 110, a gaming device 300, a peripheral device 2400 associated with the gaming device, and/or a peripheral device server 2450) to establish the appropriate connection between the slot machine 300 and the selected content provider, such as content provider 125. For example, if the player has selected a web site-based premium entertainment service provided by content provider 125, which is accessed via the Internet network 150, the network server 110 preferably enters the URL in a web browser, such as Netscape, to access the desired web site.

Once the connection is established to the selected content provider during step 735, such as the web-based content provider 125, the account number and password, if any, retrieved during step 730, are preferably transmitted to the content provider 125 during step 740. Thereafter, the network server 110 preferably queries the clock 240 during step 745 to determine the time at which the connection is initially established.

The network server 110 preferably resumes monitoring the level of play during step 750 to determine whether the current level of play is sufficient to maintain this player's access to the premium entertainment services. Thus, a test is performed during step 755 to determine if the casino-specified criteria for maintaining access to the premium entertainment services is met. For example, in the illustrative embodiment, the establishment-specific criteria will maintain the premium entertainment services for (i) all players on certain classes of electronic gaming devices, regardless of the player's current level of play; (ii) certain players based on their prior playing history, regardless of the player's current level of play, (iii) for those players whose current level of play meets or exceeds a predefined threshold, and (iv) for those players who provide a cash payment or player reward points awarded as part of a slot club or an arcade incentive program.

If it is determined during step 755 that the establishment-specific criteria for maintaining access to the entertainment services is currently being met, program control returns to step 750, and the network server 110 or other device performing the steps of 700 continues monitoring the player's level of play until the establishment-specific criteria for providing the player access to the services is no longer being met, or until play is terminated.

Once it is determined in step 755 that the establishment-specific criteria for providing players access to the entertainment services is no longer being met, program control proceeds to step 760, where the network server 110 (or other device performing the steps of process 700) transmits a disconnection warning to the gaming device 300 for output to the player. The disconnection warning may include options for maintaining the connection to the selected content provider 125. In one illustrative embodiment, the disconnection warning can indicate that the player can maintain the connection to the entertainment service by (i) complying with the casino's level of play requirements to maintain complimentary access (the establishment-specific criteria); (ii) depositing coins in the electronic gaming device or otherwise providing an additional payment, for example, by means of a credit card, debit card or smart card; or (iii) allowing a deduction of earned credits from current slot play prizes or player reward points.

Thereafter, a test is performed during step 765 to determine if the player has complied with the establishment-specific criteria for maintaining the connection within a predefined timeout period. Thus, if it is determined during step 765 that the player has complied with the establishment-specific criteria for maintaining the connection within a predefined timeout period, program control returns to step 750, and the network server 110 (or other device performing steps of process 700) continues monitoring the player's level of play until the establishment-specific criteria for offering access to the entertainment services is again no longer being met, or until play is terminated.

If, however, it is determined during step 765 that the player has failed to comply with the establishment-specific criteria for maintaining the connection (or for continuing to provide the entertainment service) within a predefined timeout period, program control proceeds to step 770 (FIG. 7C), where the network server 110 (or other device performing steps of process 700) disconnects the connection to the selected content provider 125 or otherwise discontinues providing access to the entertainment service. The network server 110 (or other device performing steps of process 700) may create a record of the connection in the connection record database 600 during step 780. As previously indicated, this record may be utilized to confirm any billing information received from the content provider 125. Thereafter, the network server 110 (or other device performing steps of process 700) exits the process during step 785 to wait for the next play session which may be entitled to access a entertainment service.

The establishment at which the entertainment services are provided to players may be billed by each content provider for the total connection time on each gaming device. The billing information can be verified, for example, using the connection record database 500.

Figure 8:
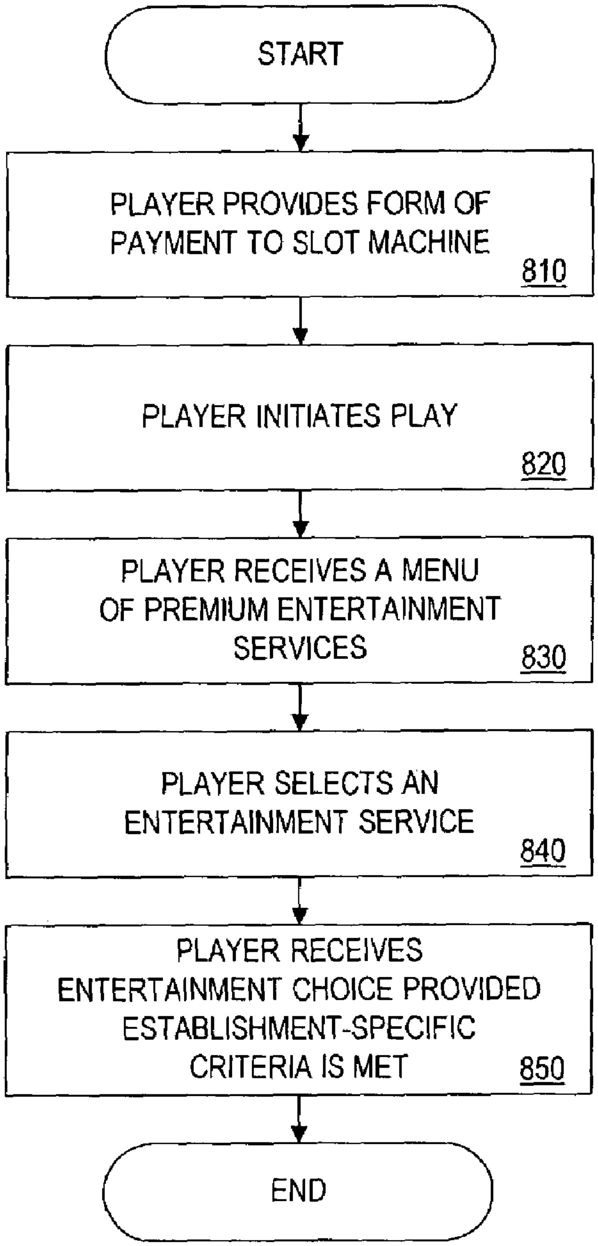
FIG. 8 is a flow chart illustrating an exemplary process consistent with one or more embodiments of the present invention.

An exemplary process from the point of view of a player is shown in FIG. 8. As shown in FIG. 8, a player initiates the process during step 810 by providing a form of payment to a gaming device 300, for example, by depositing coins, or inserting a credit card, debit card or smart card. Thereafter, the player optionally initiates play of the gaming device 300 during step 820, for example, by pressing a starting controller 374 (FIG. 3). According to an embodiment of the invention, the player may receive a menu of the available entertainment services during step 830, and make a selection of a desired entertainment service during step 840. Thereafter, the player receives access to the selected entertainment service during step 850 for as long as the player complies with the establishment-specific criteria for accessing such entertainment services, in the manner described above.

As described above, in accordance with one or more embodiments of the invention, the gaming device 300 may perform some or all of the functionality of the pay-per-view content provider 115 and/or the network server 110. For example, the content database 500 may be stored on or at the gaming device 300 (e.g. via data storage device 320).

As described above, in accordance with such an embodiment, the information stored in the access information field 530 of the content database 500 may include an indication of the content to be provided and/or the content itself. For example, the information stored in the access information field 530 may include a file in an appropriate format (e.g., .mpg .mpg2, .avi, .mov .wav, etc.) that may be executed by the gaming device CPU 310 in order to output audio/video content to the gaming device player. Such files may be stored in a compressed, uncompiled and/or encrypted format. According to one embodiment, such files may be loaded on to portable media, such as a compact disc (CD) or digital video disk (DVD) and loaded periodically (e.g., as needed) or entirely onto data storage device 320.

Thus, a gaming device player having achieved establishment-specific criteria may receive premium content at the gaming device 300 while minimizing the need for two-way communication between the gaming device 300, the network server 110 and/or the content provider 115.

In accordance with one or more embodiments, a player may initially gain access to an entertainment service at one gaming device and subsequently continue to gain access to the entertainment service at another device. For example, a player may begin viewing a movie at a first gaming device and continue viewing the movie at another gaming device. In such embodiments, an indication of the point at which the player discontinued viewing the movie or otherwise perceiving an entertainment service may be stored in association with the player (e.g., in a player tracking database or on a player tracking card) such that the entertainment service may continue to be provided to the player from the point at which the player discontinued access to the entertainment service.

In accordance with one embodiment, a player may be provided access to an entertainment service before the player has qualified for access to the entertainment service. In another embodiment, a player may access an entertainment service and agree to be charged for the entertainment service. In either of the above-described embodiments, a player's activities subsequent to accessing the entertainment service may be monitored and determined to be sufficient to retroactively qualify the player for access to the entertainment service or to eliminate a charge for the entertainment service. For example, a player may be provided with an entertainment service in exchange for a charge of two coins, to be applied to an account associated with the player. However, if the player achieves a predetermined rate of play (e.g., ten game plays per minute for a minimum of ten minutes) within a predetermined period of time (e.g., the current gaming session engaged in by the player) the charge will not be applied to the player's account.

Note that the processes of the present invention may be implemented in an online casino environment as well as in a brick-and-mortar casino or other establishment where a gaming device is located. For example, a player using a personal computer to play games at an online casino may qualify for access to web site content that the player would otherwise have to provide payment to access.

It is to be understood that the embodiments and variations shown and described herein are merely illustrative of the principles of this invention and that various modifications may be implemented by those skilled in the art without departing from the scope and spirit of the invention.

We claim:

1. A method for providing entertainment content to a player of a gaming device, comprising:

storing entertainment content at a gaming device, wherein the entertainment content is content independent of a content of a game being played at the gaming device;

monitoring a level of play of a player of the gaming device;

determining that the level of play is at least equal to a predetermined level of play; and enabling access, by a player of the gaming device, to the entertainment content based on the determination that the level of play is at least equal to the predetermined level of play.

2. The method of claim 1, further comprising:

continuing to provide access to the entertainment content during game play of the gaming device as long as the level of play continues to be at least equal to a second predetermined level of play.

3. The method of claim 1, further comprising:

determining, after the step of enabling, that the level of play is below the predetermined level of play; and outputting a message to the player, wherein the message indicates that access to the entertainment content will be discontinued at a predetermined time if the level of play does not again equal the predetermined level of play by the predetermined time.

4. The method of claim 1, wherein the step of enabling access comprises:

enabling access, by the player, to a predetermined portion of the content based on the determination that the level of play is at least equal to the predetermined level of play.

5. The method of claim 1, wherein the step of enabling access comprises:

enabling a first level of access if the level of play is determined to be a first level of play, and enabling a second level of access if the level of play is determined to be a second level of play.

6. The method of claim 1, wherein the step of storing comprises storing at least a first type of content and a second type of content at the gaming device, and wherein the step of enabling access comprises:

enabling access to a first type of content if the level of play is determined to be a first level of play, and enabling access to a second type of content if the level of play is determined to be a second level of play.

7. The method of claim 1, further comprising:

outputting to the player an indication of the enablement of the access to the content.

8. The method of claim 7, wherein the step of storing comprises storing at least a first type of content and a second type of content at the gaming device; and wherein the step of outputting comprises:

outputting to the player an indication of the at least a first type of content and a second type of content, with a request that the player select one of the first type of content and the second type of content.

9. The method of claim 8, further comprising:

outputting, to the player, the type of content chosen by the player.

10. The method of claim 1, further comprising:

outputting the content to the player.

11. The method of claim 1, wherein the level of play is based on at least one of a rate of play of the gaming device;

a profitability per unit of time associated with the player;

a number of a particular type of game played by the player within a predetermined unit of time;

a sum of wagers placed by the player within a predetermined unit of time;

a sum of payouts won by the player within a predetermined unit of time;

a duration of time the player has played the gaming device;

a current credit meter balance of the gaming device; and a change in the credit meter balance of the gaming device, the change being calculated between a first point in time and a second point in time.

12. A method for providing entertainment content to a player of a gaming device, comprising:

storing, at a peripheral device associated with a gaming device, entertainment content;

monitoring a level of play of the gaming device by the player;

determining that the level of play is at least equal to a predetermined level of play; and enabling access, by the player, to the entertainment content based on the determination that the level of play is at least equal to the predetermined level of play.

13. The method of claim 12, wherein the level of play is based on at least one of a rate of play of the gaming device;

a profitability per unit of time associated with the player;

a number of a particular type of game played by the player within a predetermined unit of time;

a sum of wagers placed by the player within a predetermined unit of time;

a sum of payouts won by the player within a predetermined unit of time;

a duration of time the player has played the gaming device;

a current credit meter balance of the gaming device; and a change in the credit meter balance of the gaming device, the change being calculated between a first point in time and a second point in time.

14. A method for providing to a player of a gaming device access to an entertainment service, comprising:

determining that a status of a player satisfies at least one predetermined criteria for providing to the player access to at least one entertainment service;

establishing, based on the determination, communication between a gaming device being played by the player and a provider of the entertainment service.

15. The method of claim 14, wherein the provider of the entertainment service comprises at least one of:

a provider of a television broadcast;

a provider of a shared revenue telephone service; and a provider of Internet service.

16. The method of claim 14, wherein the step of establishing comprises:

retrieving from memory contact information for the provider of the entertainment service; and establishing, using the contact information, a connection between the gaming device and the provider of the entertainment service via a network external to an establishment in which the gaming device is located.

17. The method of claim 14, wherein the step of determining comprises:

determining that a level of play achieved by the player is at least equal to a predetermined level of play.

18. The method of claim 17, wherein the level of play is based on at least one of:

a rate of play of the gaming device;

a profitability per unit of time associated with the player;

a number of a particular type of game played by the player within a predetermined unit of time;

a sum of wagers placed by the player within a predetermined unit of time;

a sum of payouts won by the player within a predetermined unit of time;

a duration of time the player has played the gaming device;

a current credit meter balance of the gaming device; and a change in the credit meter balance of the gaming device, the change being calculated between a first point in time and a second point in time.

19. The method of claim 14, wherein the step of determining comprises:

determining that prior gaming history of the player satisfies a predetermined criterion.

20. The method of claim 14, further comprising:

receiving a request from a player for access to an entertainment service.

21. The method of claim 14, further comprising:

outputting to the player an indication of at least two available entertainment services; and receiving from the player a selection of one of the at least two available entertainment services.

22. The method of claim 21, further comprising:

determining a subset of available entertainment services from a set of available entertainment services; and wherein the step of outputting comprises:

outputting to the player an indication of each of the entertainment services included in the subset of entertainment services.

23. The method of claim 22, wherein the step of determining a subset comprises:

determining, based on at least one entertainment service previously selected by the player, a subset of available entertainment services from a set of available entertainment services.

24. The method of claim 22, wherein the step of determining a subset comprises:

determining, based on at least one predetermined factor, a subset of available entertainment services from a set of available entertainment services.

25. A method, comprising:

monitoring, at a first device, play of a gaming device by a player;

determining, based on the play of the gaming device, that the player has satisfied a predetermined standard; and arranging for the player to obtain access to an entertainment service based on the satisfaction of the predetermined standard.

26. The method of claim 25, wherein the first device is the gaming device.

27. The method of claim 25, wherein the first device is a server in communication with the gaming device.

28. The method of claim 25, wherein the first device is a peripheral device associated with the gaming device.

29. The method of claim 25, further comprising:

outputting to the player an indication of a plurality of available entertainment services;

receiving from the player a selection of one of the available entertainment services.

30. The method of claim 25, wherein the step of arranging comprises:

retrieving from memory content comprising the entertainment service; and outputting the content to the player.

31. The method of claim 25, wherein the step of arranging comprises:

establishing, via a network external to an establishment in which the gaming device is located, communication between the gaming device and a device operative to output the entertainment service to the player.

32. An electronic gaming system for allowing a slot machine player to bet on randomized events and being operative to provide said player with access to a premium entertainment service, said electronic gaming system comprising:

means for generating a random event for each play of said slot machine;

means for determining a game result based on said random event; and means based on to the play of said slot machine for enabling access to said premium entertainment service, wherein said means for enabling access enables access when said player meets at least one predefined standard.

33. An electronic gaming system for allowing a slot machine player to bet on randomized events and being operative to provide said player with access to a premium entertainment service, said electronic gaming system comprising:

means for generating a random event for each play of said slot machine;

means for determining a game result based on said random event;

means based on the play of said slot machine for enabling access to said premium entertainment service; and means for presenting said player with a menu of available premium entertainment services and for receiving a selection from said player of a desired premium entertainment service.

34. An electronic gaming system for allowing a slot machine player to bet on randomized events and being operative to provide said player with access to a premium entertainment service, said electronic gaming system comprising:

means for generating a random event for each play of said slot machine;

means for determining a game result based upon said random event;

means based on the play of said slot machine for enabling access to said premium entertainment service; and means for storing a record of connections made by said electronic gaming system to each premium entertainment service.

35. An electronic gaming system for allowing a slot machine player to bet on randomized events and being operative to provide said player with access to a premium entertainment service, said electronic gaming system comprising:

means for generating a random event for each play of said slot machine;

means for determining a game result based upon said random event; and means for enabling access to said premium entertainment service based on the play of said slot machine, wherein said game result and said premium entertainment service are displayed to said player by means of a virtual reality headset.

36. An electronic gaming system for allowing a slot machine player to bet on randomized events and being operative to provide said player with access to a premium entertainment service, said electronic gaming system comprising:

means for generating a random event for each play of said slot machine;

means for determining a game result based upon said random event; and means based on the play of said slot machine for enabling access to said premium entertainment service, wherein said premium entertainment service is a web site.

37. An electronic gaming system for allowing a slot machine player to bet on randomized events and being operative to provide said player with access to a premium entertainment service, said electronic gaming system comprising:

means for generating a random event for each play of said slot machine;

means for determining a game result based upon said random event; and means for enabling access to said premium entertainment service based on the play of said slot machine, wherein said premium entertainment service is a shared-revenue telephone service.

38. A method for allowing a player to bet on randomized events using an electronic gaming device and for providing said player with access to a premium entertainment service, said method comprising:

generating a random event for each play of said electronic gaming device;

determining a game result based upon said random event; and enabling access to said premium entertainment service based on the play of said electronic gaming device, wherein said enabling is performed when said player meets a predefined standard.

39. A method for allowing a player to bet on randomized events using an electronic gaming device and for providing said player with access to a premium entertainment service, said method comprising:

generating a random event for each play of said electronic gaming device;

determining a game result based upon said random event;

enabling access to said premium entertainment service based on the play of said electronic gaming device; and presenting said player with a menu of available premium entertainment services and for receiving a selection from said player of a desired premium entertainment service.

40. A method for allowing a player to bet on randomized events using an electronic gaming device and for providing said player with access to a premium entertainment service, said method comprising:

generating a random event for each play of said electronic gaming device;

determining a game result based upon said random event;

enabling access to said premium entertainment service based on the play of said electronic gaming device; and storing a record of connections made by said electronic gaming system to said premium entertainment service.

41. A method for allowing a player to bet on randomized events using an electronic gaming device and for providing said player with access to a premium entertainment service, said method comprising:

generating a random event for each play of said electronic gaming device;

determining a game result based upon said random event;

enabling access to said premium entertainment service based on the play of said electronic gaming device; and displaying said game result and said premium entertainment service to said player by means of a virtual reality headset.

42. A method for allowing a player to bet on randomized events using an electronic gaming device and for providing said player with access to a premium entertainment service, said method comprising:

generating a random event for each play of said electronic gaming device;

determining, a game result based upon said random event; and enabling access to said premium entertainment service based on the play of said electronic gaming device, wherein said premium entertainment service is a web site.

43. A method for allowing a player to bet on randomized events using an electronic gaming device and for providing said player with access to a premium entertainment service, said method comprising:

generating a random event for each play of said electronic gaming device;

determining a game result based upon said random event; and enabling access to said premium entertainment service based on the play of said electronic gaming device, wherein said premium entertainment service is a shared-revenue telephone service.

44. A gaming machine comprising:

means for receiving a player tracking card;

means for reading a player identification number from said player tracking card;

means for generating a random event for each play of said gaming machine;

means for determining a game result based upon said random event;

means for awarding incentive points for each play of said gaming machine in an account associated with said player identification number;

means for accessing a premium entertainment service from said gaming machine; and means for deducting incentive points from said account in exchange for accessing said premium entertainment service.

45. A medium storing instructions adapted to be executed by a processor to perform a method for allowing a player to bet on randomized events using an electronic gaming device and for providing said player with access to a premium entertainment service, said method comprising:

generating a random event for each play of said electronic gaming device;

determining a game result based upon said random event; and enabling access to said premium entertainment service based on the play of said electronic gaming device, wherein said enabling is performed when said player meets a predefined standard.

46. The method of claim 1 further comprising, prior to storing, loading entertainment content files onto a portable medium.

47. The method of claim 46 wherein storing entertainment content at the gaming device comprises loading the entertainment content files from the portable medium to the gaming device.

48. The method of claim 47 wherein loading the entertainment content files from the portable medium to the gaming device comprises periodically loading the entertainment files from the portable medium to the gaming device.

49. The method of claim 46 wherein loading entertainment content files onto the portable medium comprises loading the entertainment content files onto a compact disc.

50. The method of claim 12 wherein enabling access to the entertainment content comprises displaying the entertainment content on the peripheral device.

51. The method of claim 1 further comprising setting the level of play.

52. The method of claim 51 wherein setting the level of play comprises a provider of the entertainment content setting the level of play.

53. The method of claim 51 wherein setting the level of play comprises a manufacturer of the gaming device setting the level of play.

54. The method of claim 2 wherein the predetermined level of play and the second predetermined level of play are identical.

55. The method of claim 2 wherein the predetermined level of play and the second predetermined level of play are different.

56. The method of claim 22 wherein determining the subset of available entertainment services from the set of available entertainment services comprises determining the subset based on previously indicated player preferences.

57. The method of claim 56 wherein determining based on previously indicated player preferences comprises determining based on player preferences stored in a player tracking database.

58. The method of claim 1 wherein monitoring the level of play comprises monitoring the level of play with a peripheral device.

59. The method of claim 58 wherein enabling access to the entertainment content comprises enabling access to the entertainment content through the peripheral device.

60. The method of claim 1, wherein the level of play is based on at least one of:

a length of time the player has played in a particular establishment;

an initial credit meter balance established by the player at a beginning of a gaming session;

a number of particular gaming devices played by the player during a predetermined period of time; and a number of types of gaming devices the player has played during a predetermined period of time.

61. A method comprising:

storing entertainment content;

determining if a player of a gaming device has satisfied a criterion for access to the entertainment content;

enabling access, by the player of the gaming device, to the entertainment content based on the determining; and storing an indication of costs associated with the entertainment content.

* * * * *